United States Patent
Park et al.

(10) Patent No.: US 9,606,721 B2
(45) Date of Patent: Mar. 28, 2017

(54) MOBILE TERMINAL AND CONTROL METHOD THEREOF

(71) Applicant: LG ELECTRONICS INC., Seoul (KR)

(72) Inventors: Yonghahk Park, Seoul (KR); Younghan Kim, Seoul (KR); Mihyun Park, Seoul (KR); Gukchan Lim, Seoul (KR); Seonghyok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 239 days.

(21) Appl. No.: 14/332,058

(22) Filed: Jul. 15, 2014

(65) Prior Publication Data

US 2015/0026647 A1  Jan. 22, 2015

(30) Foreign Application Priority Data

Jul. 22, 2013 (KR) .................. 10-2013-0086289
Aug. 2, 2013 (KR) .................. 10-2013-0092215

(51) Int. Cl.
| | | |
|---|---|---|
| G06F 3/0488 | (2013.01) | |
| G06F 1/16 | (2006.01) | |
| G06F 1/32 | (2006.01) | |
| G06F 3/01 | (2006.01) | |
| G06F 3/0346 | (2013.01) | |

(52) U.S. Cl.
CPC .......... *G06F 3/0488* (2013.01); *G06F 1/163* (2013.01); *G06F 1/1694* (2013.01); *G06F 1/3231* (2013.01); *G06F 1/3246* (2013.01); *G06F 3/016* (2013.01); *G06F 3/017* (2013.01); *G06F 3/0346* (2013.01); *Y02B 60/1289* (2013.01)

(58) Field of Classification Search
CPC ...................................................... G06F 1/163
See application file for complete search history.

(56) References Cited

U.S. PATENT DOCUMENTS

2011/0265045 A1* 10/2011 Hsieh .................. G06F 3/04883
  715/863
2013/0085410 A1* 4/2013 Alberth ................ A61B 5/7435
  600/557

* cited by examiner

*Primary Examiner* — Peiyong Weng
(74) *Attorney, Agent, or Firm* — Lee, Hong, Degerman, Kang & Waimey

(57) ABSTRACT

A mobile terminal is provided a mobile terminal and a control method thereof according to exemplary embodiments. The mobile terminal includes a main body that is configured to be wearable on a specific portion of a user's body, a sensing unit that is configured to sense whether or not the main body has been worn, and also sense a user gesture for deciding the worn position of the main body, and a controller that is configured to decide the worn position of the main body according to the sensed user gesture, and setting a user input for generating a first control command in a different manner based on the decided worn position. With the configuration, the main body may sense the worn position by itself so as to provide a user interface, which is more intuitive and convenient for the user, according to the sensed worn position.

12 Claims, 25 Drawing Sheets

(a)                    (b)

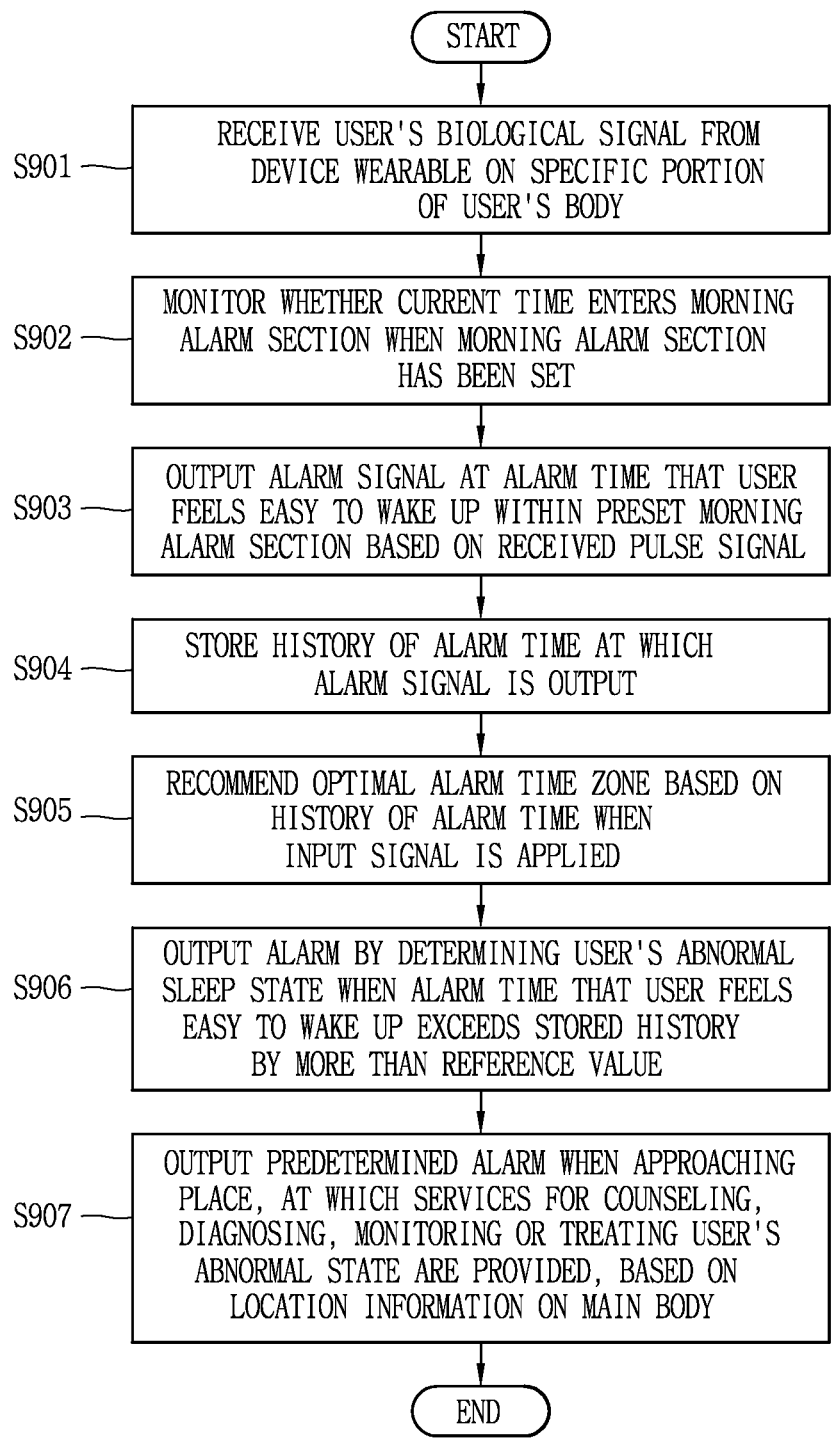

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2013-0086289, filed on Jul. 22, 2013, and Korean Application No. 10-2013-0092215, filed on Aug. 2, 2013, the contents of which is incorporated by reference herein in its entirety.

BACKGROUND OF THE DISCLOSURE

1. Field of the Disclosure

This specification relates to a mobile terminal, and particularly, to a mobile terminal capable of being worn on a specific portion of a user's body and supporting wireless communication with an external device, and a control method thereof.

2. Background of the Disclosure

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Many efforts include not only changes and improvement of structural components implementing a mobile terminal but also software improvement to support and improve functions of the terminal.

Owing to the improvements, terminals are evolving into various types of designs. In detail, as the terminals become much light in weight and compact in size, various types of terminals, such as a glass type, a watch type, a necklace type, a wristlet type, a ring type, and the like, which are contactable with a part of a user's body, have been developed. In addition, a type of terminal which is allowed to be mounted on a user's clothes is under development.

In such a manner, when a terminal is worn on various positions of a user's body for use according to the user's usage purpose or intent, a user environment has to be changed depending on the worn position. Accordingly, user interfaces appropriate for the respective user environments are required.

In the meantime, for example, when an alarm function is set in a terminal which is provided with a user interface appropriate for each user environment, the user feels inconvenient in view of releasing the set alarm function by himself/herself or having to terminating the alarm by manipulating the terminal after waiting for going off the alarm even though the user has waken up before the set alarm time (namely, even though the user is in an awake state). Also, the alarm function in the related art is carried out to merely output an alarm sound at a set time, and interferes with physical rhythm due to never considering the user's sleep state.

SUMMARY OF THE DISCLOSURE

Therefore, an aspect of the detailed description is to provide a mobile terminal, capable of providing user interfaces in a convenient manner according to a position where the terminal is worn, by automatically recognizing the worn position, and a control method thereof.

Another aspect of the detailed description is to provide a mobile terminal, capable of controlling an activation of an alarm function by recognizing a user's sleep state based on a user's biological signal, and a control method thereof.

Another aspect of the detailed description is to provide a mobile terminal, capable of determining whether or not a user is sleeping based on an operation or non-operation or non-use of a home appliance, and providing a smart alarm function appropriate for the user's state, and a control method thereof.

Another aspect of the detailed description is to provide a mobile terminal, capable of providing appropriate visual alarm information by monitoring a user's biological signal, and checking a user's health condition based on the information, and a control method thereof.

To achieve these and other advantages and in accordance with the purpose of this specification, as embodied and broadly described herein, there is provided a mobile terminal including a main body that is configured to be wearable on a specific portion of a user's body, a sensing unit that is configured to sense whether or not the main body has been worn, and also sense a user gesture for deciding the worn position of the main body, and a controller that is configured to decide the worn position of the main body according to the sensed user gesture, and setting a user input for generating a first control command in a different manner based on the decided worn position.

In one exemplary embodiment disclosed herein, the controller may output a request message for requesting an input of a preset type of initial gesture when the main body has been worn, and decide the worn position of the main body by analyzing a sensor value of the input initial gesture when the initial gesture is input in response to the request.

In one exemplary embodiment disclosed herein, the controller may monitor the user input for generating the first control command for a preset time, and decide the worn position of the main body based on an input pattern generated according to the monitoring result.

In one exemplary embodiment disclosed herein, the controller may decide wearing or non-wearing of the main body and the worn position based on whether or not a connector coupled to the main body comes in contact with the user's body and a biological signal.

In one exemplary embodiment disclosed herein, the mobile terminal may further include a user input unit that is configured to allow for inputting a control command for setting one of a first mode and a second mode, each employing a different method of deciding the worn position of the main body. The controller may output a list indicating wearable positions of the main body in the first mode, and recognize an item selected from the output list as the worn position. Also, the controller may automatically recognize the worn position based on the sensed user gesture in the second mode.

In one exemplary embodiment disclosed herein, the mobile terminal may further include a display unit having a touch sensor disposed thereon. The display unit may include a first region for outputting screen information, and a second region for outputting keys to control the screen information output on the first region. The controller may control the display unit in such a manner that the first and second regions are arranged in a different manner according to the decided worn position.

In one exemplary embodiment disclosed herein, the controller may control the display unit in such a manner that the first region is arranged based on a left side of the display unit and the second region is arranged based on a right side of the display unit when the main body is worn around a left wrist.

In one exemplary embodiment disclosed herein, the controller may control the display unit in such a manner that the first region is arranged based on a right side of the display unit and the second region is arranged based on a left side of the display unit when the main body is worn around a right wrist.

In one exemplary embodiment disclosed herein, the controller may control the display unit to change a screen of a lock state for restricting an input of a control command with respect to an application, according to the decided worn position. The controller may control the display unit to output a different idle screen according to the decided worn position when a control command for releasing the lock state is input.

In one exemplary embodiment disclosed herein, the controller may activate a first function corresponding to a first input when the decided worn position is a first position, and deactivate the first function corresponding to the first input when the decided worn position is changed from the first position into a second position.

In one exemplary embodiment disclosed herein, the controller may control an output or non-output of event information related to a received event and a reception alarm to differ according to the decided worn position when the event is received.

In one exemplary embodiment disclosed herein, the controller may control a predetermined alarm for notifying the decided worn position to be output when the worn position of the main body is decided.

In one exemplary embodiment disclosed herein, the controller may restore a method of applying a user input for generating the first control command to an initial state when the worn main body is removed.

In one exemplary embodiment disclosed herein, the sensing unit may sense a user's biological signal from the main body worn on the specific portion of the user's body. The controller may check a user's state based on the sensed biological signal when a morning alarm time is set. The controller may output an alarm signal corresponding to the set morning alarm time by taking into account a sleep state in which the user feels easy to wake up when the checked user's state is determined as a sleep state, and deactivate an alarm function of a morning alarm time for today when the user's state is determined as an awake state.

In one exemplary embodiment disclosed herein, the mobile terminal may further include a display unit that is configured to output a lock screen corresponding to a lock state for restricting an input of a control command with respect to an application. The controller may control the display unit to output, on the lock screen, a graphic user interface (GUI) for releasing the alarm function corresponding to the morning alarm time for today when a user manipulation with respect to the main body is sensed before the preset morning alarm time.

In one exemplary embodiment disclosed herein, the mobile terminal may further include a wireless communication unit that is configured to receive an operation signal sensed by a sensor mounted in at least one home appliance or home facility. The controller may determine whether or not the user has waked up based on the operation signal received through the wireless communication unit and the sensed biological signal.

In one exemplary embodiment disclosed herein, the controller may control an alarm function of the received event to be deactivated, in response to a reception of an event in the main body in a state where the user's state corresponding to the sensed biological signal is determined as the sleep state.

In one exemplary embodiment disclosed herein, the controller may calculate a user's stress level based on the sensed biological signal. The controller may control an alarm function corresponding to the event generation to be deactivated and a popup of a notification message with low importance to be restricted when the calculated stress level exceeds a preset threshold value.

In one exemplary embodiment disclosed herein, the mobile terminal may further include a storage unit that is configured to store a history of alarm time at which the user feels easy to wake up for a preset period of time. The controller may control an optimal alarm time zone to be automatically recommended based on the stored history of alarm time when an alarm time recommendation request is received.

In one exemplary embodiment disclosed herein, the main body may be configured to sense wearing of a link covering a user's wrist, and the link may be configured to sense a user's pulse signal to transmit to the main body. The controller may monitor whether or not a current time enters a preset morning alarm section when the morning alarm section is set in the main body. The controller may control an alarm signal to be output at an alarm time, at which the user feels easy to wake up, within the set morning alarm section based on the pulse signal transmitted from the link.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings:

FIG. 16 is a flowchart illustrating a control method for a mobile terminal in accordance with another exemplary embodiment of the present disclosure.

DETAILED DESCRIPTION OF THE DISCLOSURE

Figure 1:
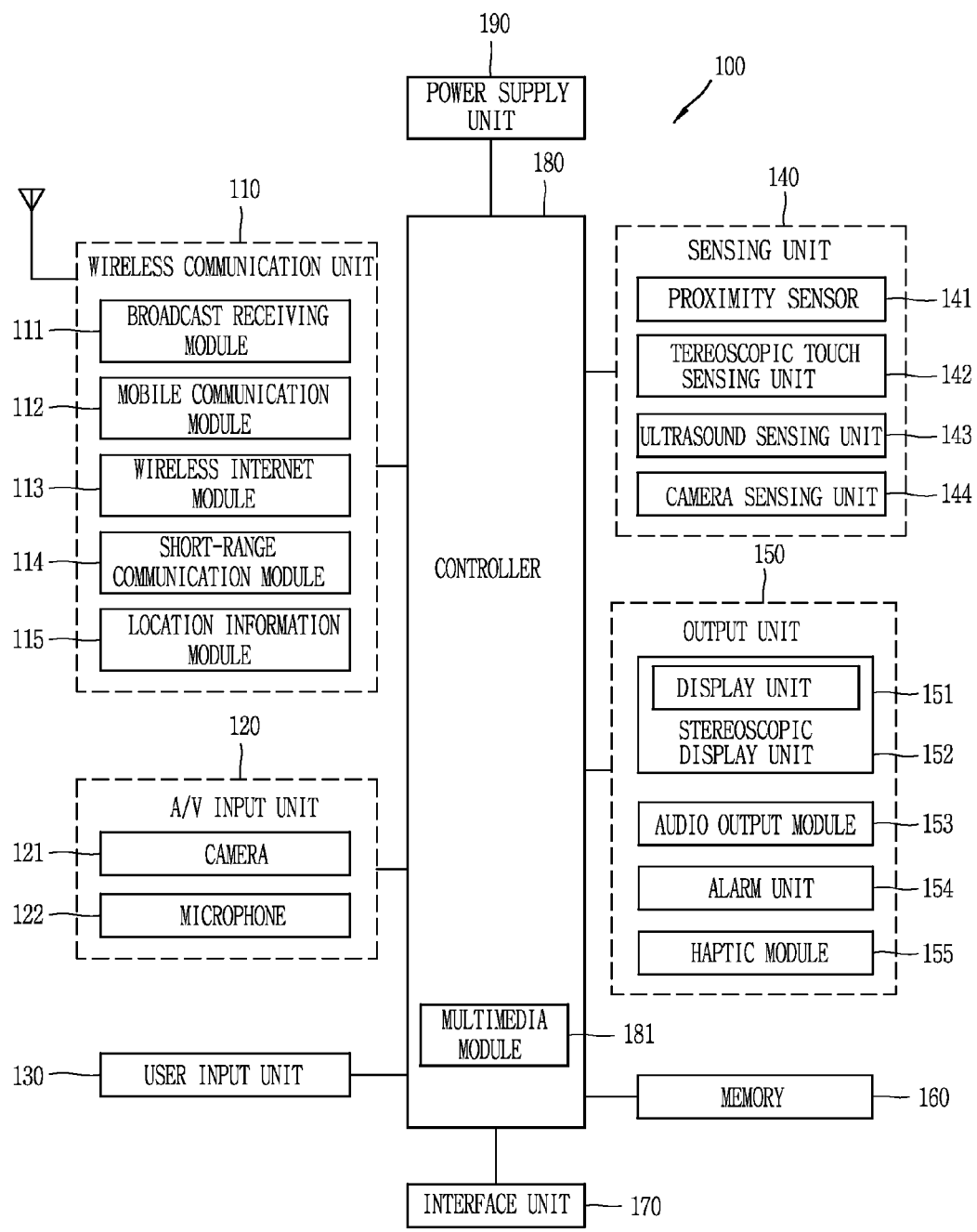
FIG. 1 is a block diagram of a mobile terminal in accordance with one exemplary embodiment of the present disclosure.

Hereinafter, preferred embodiments of the present invention will be described in detail with reference to the accompanying drawings, and the same or similar elements are designated with the same numeral references regardless of the numerals in the drawings and their redundant description will be omitted. In addition, a suffix "module" or "unit" used for constituent elements disclosed in the following description is merely intended for easy description of the specification, and the suffix itself does not give any special meaning or function. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it can be easily understood by those skilled in the art that the configuration according to the following description can be applied to the stationary terminals except for components particularly provided for mobility.

The wireless communication unit 110 may typically include one or more components which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a position location module 115 and the like.

The broadcast receiving module 111 receives a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111 may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 transmits/receives wireless signals to/from at least one of network entities (e.g., base station, an external mobile terminal, a server, etc.) on a mobile communication network. Here, the wireless signals may include audio call signal, video call signal, or various formats of data according to transmission/reception of text/multimedia messages.

The mobile communication module 112 may implement a video (telephony) call mode and a voice call mode. The video call mode indicates a state of calling with watching a callee's image. The voice call mode indicates a state of calling without watching the callee's image. The wireless communication module 112 may transmit and receive at least one of voice and image in order to implement the video call mode and the voice call mode.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the NV input unit 120 may be configured to provide an audio or video signal input to the mobile terminal. The NV input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 153, an alarm unit 154 and a haptic module 155.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may also be implemented as a stereoscopic display unit 152 for displaying stereoscopic images.

Here, the stereoscopic image may be a three-dimensional (3D) stereoscopic image. The 3D stereoscopic image refers to an image making a viewer feel that a gradual depth and reality of an object on a monitor or a screen is the same as a realistic space. The 3D stereoscopic image may be implemented by using binocular disparity. Binocular disparity refers to disparity made by the positions of two eyes. When two eyes view different 2D images, the images are transferred to the brain through the retina and combined in the brain to provide the perception of depth and reality sense.

The stereoscopic display unit 152 may employ a stereoscopic display scheme such as stereoscopic scheme (a glass scheme), an auto-stereoscopic scheme (glassless scheme), a projection scheme (holographic scheme), or the like. Stereoscopic schemes commonly used for home television receivers, or the like, may include Wheatstone stereoscopic scheme, or the like.

The auto-stereoscopic scheme may include, for example, a parallax barrier scheme, a lenticular scheme, an integral imaging scheme, a switchable lens, or the like. The projection scheme may include a reflective holographic scheme, a transmissive holographic scheme, and the like.

In general, a 3D stereoscopic image may be comprised of a left image (a left eye image) and a right image (a right eye image). According to how left and right images are combined into a 3D stereoscopic image, a 3D stereoscopic imaging method may be divided into a top-down method in which left and right images are disposed up and down in a frame, an L-to-R (left-to-right or side by side) method in which left and right images are disposed left and right in a frame, a checker board method in which fragments of left and right images are disposed in a tile form, an interlaced method in which left and right images are alternately disposed by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, thumbnail refers to a reduced image or a reduced still image. The thusly generated left image thumbnail and the right image thumbnail may be displayed with a horizontal distance difference therebetween by a depth corresponding to the disparity between the left image and the right image on the screen, providing a stereoscopic space sense.

A left image and a right image required for implementing a 3D stereoscopic image may be displayed on the stereoscopic display unit 152 by a stereoscopic processing unit (not shown). The stereoscopic processing unit may receive the 3D image and extract the left image and the right image, or may receive the 2D image and change it into a left image and a right image.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

When a touch sensor is overlaid on the stereoscopic display unit 152 in a layered manner (hereinafter, referred to as a 'stereoscopic touch screen'), or when the stereoscopic display unit 152 and a 3D sensor sensing a touch operation are combined, the stereoscopic display unit 152 may also be used as a 3D input device.

As examples of the 3D sensor, the sensing unit 140 may include a proximity sensor 141, a stereoscopic touch sensing unit 142, an ultrasonic sensing unit 143, and a camera sensing unit 144.

The proximity sensor 141 may detect the distance between a sensing object (for example, the user's finger or a stylus pen), applying a touch by using the force of electromagnetism or infrared rays without a mechanical contact, and a detect surface. By using the distance, the terminal may recognize which portion of a stereoscopic image has been touched. In particular, when the touch screen is an electrostatic touch screen, the degree of proximity of the sensing object may be detected based on a change of an electric field according to proximity of the sensing object, and a touch to the 3D image may be recognized by using the degree of proximity.

The stereoscopic touch sensing unit 142 may be configured to detect the strength or duration of a touch applied to the touch screen. For example, the stereoscopic touch sensing unit 142 may sense touch pressure. When the pressure is strong, it may recognize the touch as a touch with respect to an object located farther away from the touch screen toward the inside of the terminal.

The ultrasonic sensing unit 143 may be configured to recognize position information relating to the sensing object by using ultrasonic waves.

The ultrasonic sensing unit 143 may include, for example, an optical sensor and a plurality of ultrasonic sensors. The optical sensor may be configured to sense light and the ultrasonic sensors may be configured to sense ultrasonic waves. Since light is much faster than ultrasonic waves, a time for which the light reaches the optical sensor may be much shorter than a time for which the ultrasonic wave reaches the ultrasonic sensor. Therefore, a position of a wave generation source may be calculated by using a time difference from the time that the ultrasonic wave reaches based on the light as a reference signal.

The camera sensing unit 144 may include at least one of the camera 121, a photo sensor, and a laser sensor.

For example, the camera 121 and the laser sensor may be combined to detect a touch of the sensing object with respect to a 3D stereoscopic image. When distance information detected by a laser sensor is added to a 2D image captured by the camera, 3D information can be obtained.

In another example, a photo sensor may be laminated on the display device. The photo sensor may be configured to scan a movement of the sensing object in proximity to the touch screen. In more detail, the photo sensor may include photo diodes and transistors at rows and columns to scan content mounted on the photo sensor by using an electrical signal changing according to the quantity of applied light. Namely, the photo sensor may calculate the coordinates of the sensing object according to variation of light to thus obtain position information of the sensing object.

The audio output module 153 may output audio data received from the wireless communication unit 110 or stored in the memory 160 in a call signal reception mode, a call mode, a record mode, a voice recognition mode, a broadcast reception mode, and the like. Also, the audio output module 153 may provide audible output signals related to a particular function (e.g., a call signal reception sound, a message reception sound, etc.) performed by the mobile terminal 100. The audio output module 153 may include a receiver, a speaker, a buzzer or the like.

The alarm unit 154 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 154 may output signals in a different manner, for example, using vibration to inform of an occurrence of an event. The video or audio signals may also be output via the display unit 151 and the audio output module 153. Hence, the display unit 151 and the audio output module 153 may be classified as parts of the alarm unit 154.

A haptic module 155 may generate various tactile effects the that user may feel. A typical example of the tactile effect generated by the haptic module 155 is vibration. Strength, pattern and the like of the vibration generated by the haptic module 155 may be controllable by a user selection or setting of the controller. For example, different vibrations may be combined to be outputted or sequentially outputted.

Besides vibration, the haptic module 155 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 155 may be implemented to allow the user to feel a tactile effect through a muscle sensation such as the user's fingers or arm, as well as transferring the tactile effect through a direct contact. Two or more haptic modules 155 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 170.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

Also, the controller 180 may execute a lock state to restrict a user from inputting control commands for applications when a state of the mobile terminal meets a preset condition. Also, the controller 180 may control a lock screen displayed in the lock state based on a touch input sensed on the display unit 151 in the lock state of the mobile terminal.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein.

Software codes can be implemented by a software application written in any suitable programming language. The software codes may be stored in the memory 160 and executed by the controller 180.

Figure 2A:
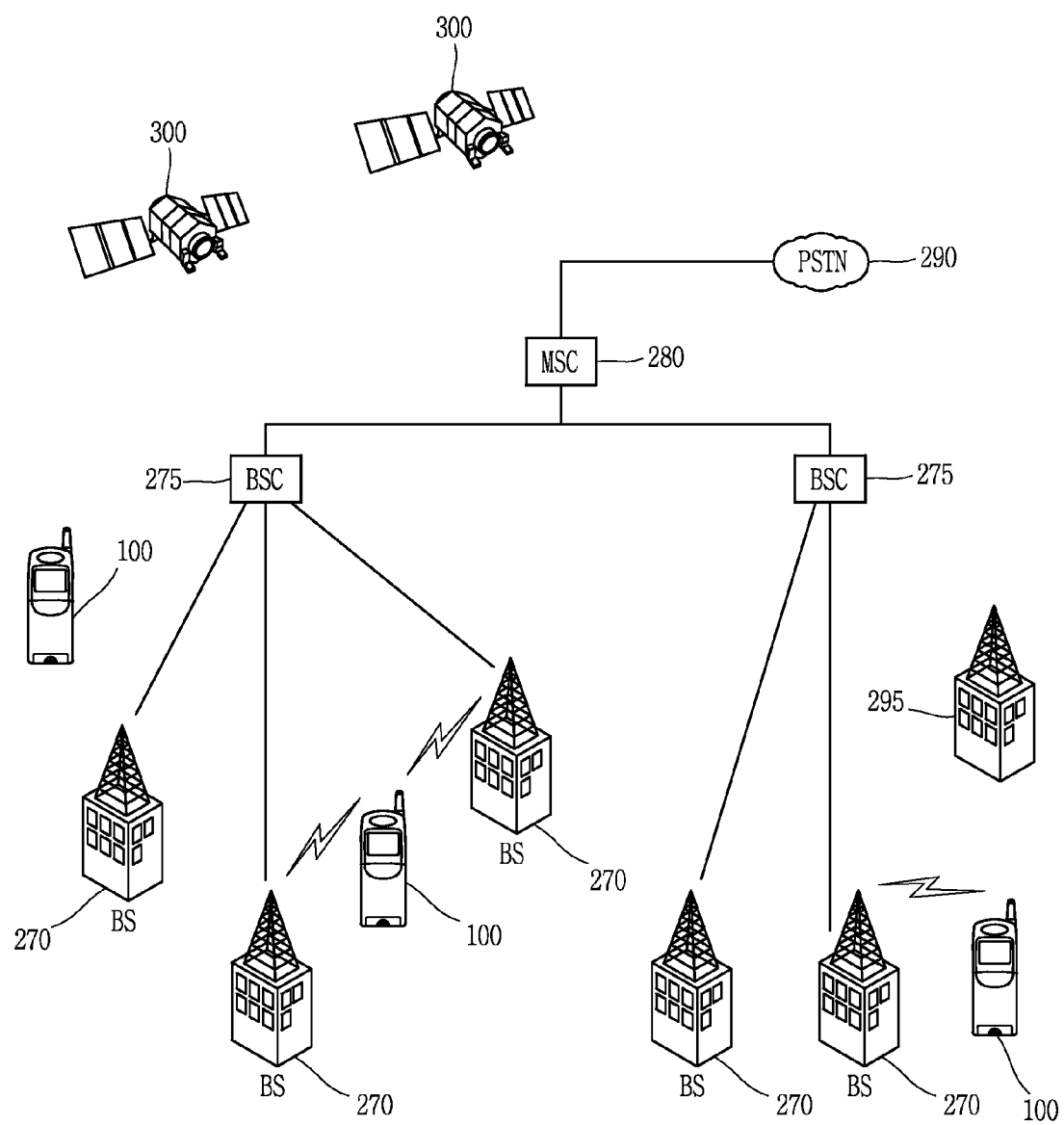
FIGS. 2A and 2B are conceptual views of a communication system operable with the mobile terminal in accordance with the one exemplary embodiment.
Figure 2B:
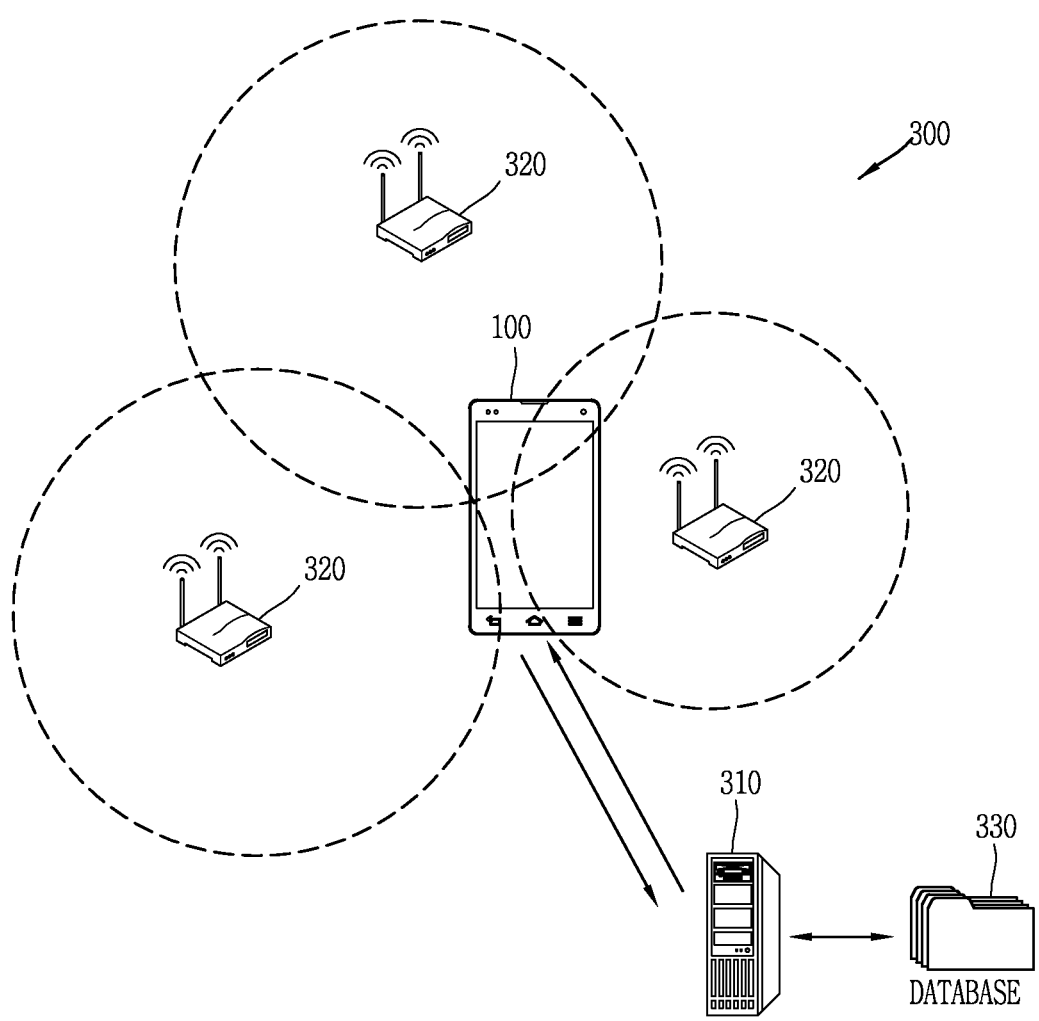

Hereinafter, a communication system which is operable with the mobile terminal 100 according to the present disclosure will be described. FIGS. 2A and 2B are conceptual views of a communication system operable with a mobile terminal 100 in accordance with the present disclosure.

First, referring to FIG. 2A, such communication systems may utilize different air interfaces and/or physical layers. Examples of such air interfaces utilized by the communication systems may include Frequency Division Multiple Access (FDMA), Time Division Multiple Access (TDMA), Code Division Multiple Access (CDMA), Universal Mobile Telecommunications System (UMTS) (especially, Long Term Evolution (LTE)), Global System for Mobile Communications (GSM), and the like.

By way of non-limiting example only, further description will relate to a CDMA communication system, but such teachings may be applied equally to other system types including the CDMA wireless communication system.

Referring now to FIG. 2A, a CDMA wireless communication system is shown having a plurality of mobile terminals 100, a plurality of base stations (BSs) 270, a plurality of base station controllers (BSCs) 275, and a mobile switching center (MSC) 280. The MSC 280 may be configured to interface with a conventional Public Switch Telephone Network (PSTN) 290. The MSC 280 may also be configured to interface with the BSCs 275. The BSCs 275 may be coupled to the BSs 270 as a pair via backhaul lines. The backhaul lines may be configured in accordance with at least one of several known interfaces including, for example, E1/T1, ATM, IP, PPP, Frame Relay, HDSL, ADSL, or xDSL. Hence, the plurality of BSCs 275 may be included in the system as illustrated in FIG. 2A.

Each BS 270 may include one or more sectors, each sector having an omni-directional antenna or an antenna pointed in a particular direction radially away from the BS 270. Alternatively, each sector may include two or more different antennas. Each BS 270 may be configured to support a plurality of frequency assignments, with each frequency assignment having a particular spectrum (for example, 1.25 MHz, 5 MHz, etc.).

The intersection of sector and frequency assignment may be referred to as a CDMA channel. The BSs 270 may also be referred to as Base Station Transceiver Subsystems (BTSs). In some cases, the term "base station" may be used to refer collectively to one BSC 275 and at least one base station 270. The base stations may also be denoted as "cell sites." Alternatively, individual sectors of a given BS 270 may be referred to as cell sites.

A broadcasting transmitter (BT) 295, as illustrated in FIG. 2A, may transmit a broadcast signal to the mobile terminals 100 operating within the system. The broadcast receiving module 111 illustrated in FIG. 1 may be typically configured inside the mobile terminal 100 to receive broadcast signals transmitted by the BT 295.

FIG. 2A further depicts several Global Positioning System (GPS) satellites 300. Such satellites 300 may facilitate locating the position of at least one of plural mobile terminals 100. Two satellites are depicted in FIG. 2, but it may be understood that useful position information may be obtained with greater or fewer satellites than two satellites. The GPS module 115 illustrated in FIG. 1 may be typically configured to cooperate with the satellites 300 to obtain desired position information. It may be appreciated that other types of position detection technologies, in addition to or instead of GPS location technology, may alternatively be implemented. If desired, at least one of the GPS satellites 300 may alternatively or additionally be configured to provide satellite DMB transmissions.

During typical operation of the wireless communication system, the BSs 270 may receive sets of reverse-link signals from various mobile terminals 100. The mobile terminals 100 may be engaging in calls, messaging, and executing other communications. Each reverse-link signal received by a given BS 270 may be processed within that BS 270. The resulting data may be forwarded to a connected BSC 275. The BSC 275 may provide call resource allocation and mobility management functionality including the orchestration of soft handoffs between BSs 270. The BSCs 275 may also route the received data to the MSC 280, which may then provide additional routing services for interfacing with the PSTN 290. Similarly, the PSTN 290 may interface with the MSC 280, and the MSC 280 may interface with the BSCs 275, which may in turn control the BSs 270 to transmit sets of forward-link signals to the mobile terminals 100.

Hereinafter, description will be given of a method for acquiring location information of a mobile terminal using a Wireless Fidelity (WiFi) Positioning System (WPS), with reference to FIG. 2B.

The WiFi positioning system (WPS) 300 refers to a positioning technology based on a wireless local area network (WLAN) using WiFi as a technology for tracking the location of the mobile terminal 100 using a WiFi module provided in the mobile terminal 100 and a wireless access point (AP) 320 for transmitting and receiving to and from the WiFi module.

The WiFi positioning system 300 may include a WiFi location determination server 310, a mobile terminal 100, a wireless access point (AP) 320 connected to the mobile terminal 100, and a database 330 stored with any wireless AP information.

The WiFi location determination server 310 may extract the information about the wireless AP 320 connected to the mobile terminal 100 based on a location information request message (or signal) of the mobile terminal 100. Information related to the wireless AP 320 may be transmitted to the WiFi location determination server 310 through the mobile terminal 100 or transmitted to the WiFi location determination server 310 from the wireless AP 320.

The information related to the wireless AP extracted based on the location information request message of the mobile terminal 100 may be at least one of MAC address, SSID, RSSI, channel information, privacy, network type, signal strength and noise strength.

The WiFi location determination server 310 may receive the information of the wireless AP 320 connected to the mobile terminal 100 as described above, and compare the received wireless AP 320 information with information contained in the pre-established database 330 to extract (or analyze) the location information of the mobile terminal 100.

On the other hand, referring to FIG. 2B, as an example, wireless APs connected to the mobile terminal 100 are illustrated as first, second, and third wireless APs 320. However, the number of wireless APs connected to the mobile terminal 100 may be changed in various ways according to a wireless communication environment in which the mobile terminal 100 is located. When the mobile terminal 100 is connected to at least one of wireless APs, the WiFi positioning system 300 can track the location of the mobile terminal 100.

Next, considering the database 330 stored with any wireless AP information in more detail, various information related to any wireless APs disposed at different locations may be stored in the database 330.

The information related to any wireless APs stored in the database 330 may be information such as a MAC address, SSID, RSSI, channel information, a privacy, a network type, latitude and longitude coordinates of the wireless AP, a building at which the wireless AP is located, a floor number, detailed indoor location information (GPS coordinates available), an AP owner's address, a phone number, and the like.

In this manner, any wireless AP information and location information corresponding to the any wireless AP may be stored together in the database 330, and thus the WiFi location determination server 310 may retrieve wireless AP information corresponding to the information related to the wireless AP 320 connected to the mobile terminal 100 from the database 330 and extract the location information matched with the retrieved wireless AP, thereby extracting location information related to the mobile terminal 100.

The extracted location information of the mobile terminal 100 may be transmitted to the mobile terminal 100 via the WiFi location determination server 310, such that the mobile terminal 100 can acquire the location information.

Meanwhile, information processed in the mobile terminal 100 disclosed herein may be displayed using a flexible display unit. The flexible display unit may include a display, which can be bent, curved, folded, rolled by an external physical force. Here, the flexible display unit may include both a general flexible display and an e-paper.

Here, the general flexible display denotes a light, non-fragile display, which still exhibits characteristics of the conventional flat panel display and is fabricated on a flexible substrate which can be curved, bent, folded, or rolled.

Also, the e-paper is a display technology employing the characteristic of a general ink, and is different from the conventional flat panel display in view of using reflected light. The e-paper may change pictures or characters by using a twist ball or an electrophoresis using a capsule.

Meanwhile, the sensing unit 140 (see FIG. 1) for sensing bending information may be provided on the flexible display unit. The term 'bending' disclosed herein may include all the meanings of 'curving,' 'rolling,' 'folding,' and the like.

The sensing unit 140 may be disposed on the overall flexible display unit or on a part of the flexible display unit, and sense the bending information related to the flexible display unit 151. Here, the bending information related to the flexible display unit 151 may include a bent direction, a bent degree, a bent position, a bent time, an acceleration that the bent flexible display unit returns to its original state, and the like. The bending information may also be various information, which can be sensed in response to the bending of the flexible display unit.

Also, the controller 180 may change information displayed on the flexible display unit or generate a control signal for controlling a function of the mobile terminal 100, based on the bending information related to the flexible display unit, sensed by the sensing unit 140. For example, when the flexible display unit is bent by an external physical force, the controller 180 may rearrange, separate or combine screen images, which have been displayed on the flexible display unit, or change curves of those screen images, based on the bent direction, the bent angle, and the return acceleration to its original state of the flexible display unit.

Besides, the controller 180 may control a method of displaying information on the flexible display unit in various manners such that the user can correctly recognize information displayed on the flexible display unit, in response to the bending of the flexible display unit.

As aforementioned, the mobile terminal 100 is evolving into various types of designs, and accordingly can be implemented to be wearable on a specific portion of a human body. This requires for more convenient user interfaces according to a position where the mobile terminal is worn.

To this end, the mobile terminal 100 according to an exemplary embodiment of the present disclosure including at least one of those components may be produced to be wearable on a specific portion of a human body (or a user's body). The mobile terminal 100 may allow the sensing unit 140 to sense a user gesture for deciding wearing or non-wearing of a main body thereof and a worn position of the main body, and provide the sensed result to the controller 180. The controller 180 may then decide the worn position of the main body based on the sensed user gesture. The controller 180 may accordingly set a different user input for generating a first control command based on the decided worn position. That is, the controller 180 may provide a different user interface, such that a user input for generating the same control command can differ according to the terminal-worn position for user convenience.

Hereinafter, description will be given of a control method of a mobile terminal for providing a different user interface according to a terminal-worn position when the mobile terminal is worn on a part of a user's body, in accordance with an exemplary embodiment disclosed herein, with reference to FIG. 3, and FIGS. 4A to 4F.

Figure 3:
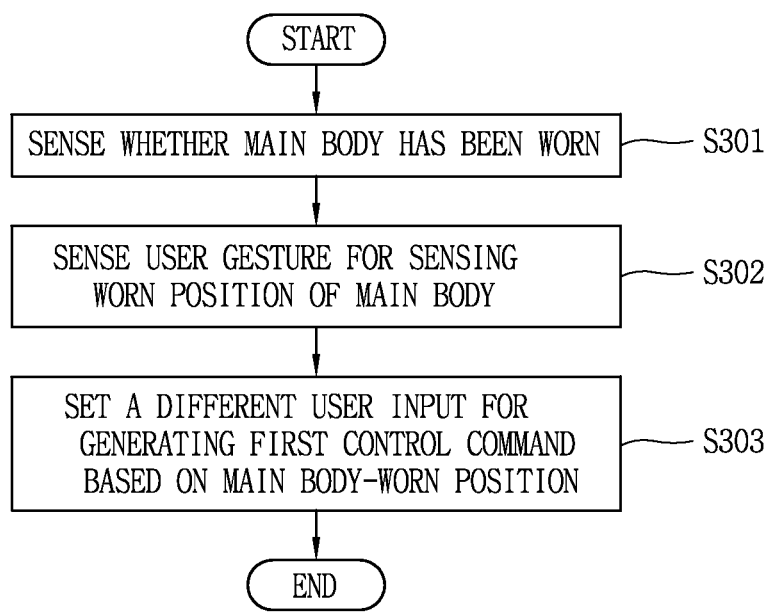
FIG. 3 is a flowchart illustrating a control method of a mobile terminal in accordance with one exemplary embodiment.

With regard to this, FIG. 3 is a flowchart illustrating a control method of a mobile terminal in accordance with one exemplary embodiment, and FIGS. 4A to 4F are conceptual views illustrating user's gestures for deciding a worn position of the mobile terminal.

First, it is premised that the mobile terminal 100 (see FIG. 1) according to the exemplary embodiment disclosed herein can be transformed into a glass type which is wearable on user's eyes, a watch type which is wearable on a wrist, a necklace type which may be hung around the user's neck, a ring type which may be put on the user's finger, a forearm type which is wearable on the user's forearm, an accessory type which may be worn on clothes, and the like (however, the present disclosure may not be limited to those). Also, for the transformation, the main body of the mobile terminal 100 may be coupled to at least one connector (for example, a bend, a hook, a pin, an adhesive, etc.)

Referring to FIG. 3, the sensing unit 140 (see FIG. 1) of the mobile terminal 100 (see FIG. 1) may sense wearing of the main body on a part of the user's body (S301).

In detail, the sensing unit 140 may sense whether or not the main body of the mobile terminal 100 has been worn by sensing an inclination and a movement of the main body of the mobile terminal 100. For example, according to the sensing result as to the extent of the inclination and movement of the main body, when an acceleration in response to the change of the inclination and the movement of the main body is the same as or similar to a pattern, which is generated when the main body is moved with being worn (mounted) on a user's body, it may be determined that the main body has been worn on a part of the user's body.

To this end, the sensing unit 140 may further include a gyro sensor (not illustrated) which can sense a spatial movement of the terminal based on x-axis, y-axis and z-axis. The sensing may also be carried out by the controller 180.

In addition, the sensing unit 140 may recognize a user's location and a worn state of the main body of the mobile terminal 100 based on an image captured by a camera 121. Accordingly, it may be confirmed whether the main body is worn on the part of the user's body or is spaced apart from the user.

If the mobile terminal 100 is coupled to at least one connector in order to be worn on the part of the user's body, when the connector comes in contact with the user's body, the sensing unit 140 may sense it as the main body has been worn on the user's body. Or, when one end and another end of the connector are connected to each other, the sensing unit 140 may recognize it as the main body has been worn on the part of the user's body. This recognition may also be carried out by the controller 180.

The sensing unit 140 may also sense the wearing of the main body, as a response, when the user pushes a predetermined key or enters a predetermined voice command after the user wears the main body. Or, the sensing unit 140 may sense the wearing of the main body as a response to the user's reaction according to guide information output through the display unit 151 or the audio output module 153 of the mobile terminal 100.

In the exemplary embodiment disclosed herein, whether or not the main body has been worn on the part of the user's body may also be sensed according to other methods, without being limited to the aforementioned manners. Also, the sensing of the wearing or non-wearing of the main body on the part of the user's body may not be carried out by a separate process but be carried out simultaneously with a sensing process of 'user gesture' for deciding a worn position, which will be explained later in more detail.

In such a manner, when the main body of the mobile terminal 100 has been worn, the sensing unit 140 may sense a user gesture for sensing a worn position of the main body (S302).

Here, the methods of determining the main body-worn position, performed by the controller 180, may include a manual mode (hereinafter, referred to as 'first mode') in which the user inputs the position in a manual manner, and an automatic mode (hereinafter, referred to as 'second mode') in which the position is recognized in an automatic manner, which will be explained herebelow.

For this, the user input unit 130 may receive a control command, which is input for setting one of the first mode and the second mode, which are different from each other in a method of deciding the main body-worn position.

Upon the selection of the first mode, the controller 180 may output a list which includes wearable positions of the main body, and recognize an item selected from the output list as a worn position. Here, the list may include information related to a plurality of wearable positions, which are selectable. The list may be output in a form of screen information on the display unit 151, or in a form of a voice message through the audio output module 153.

Figure 4A:
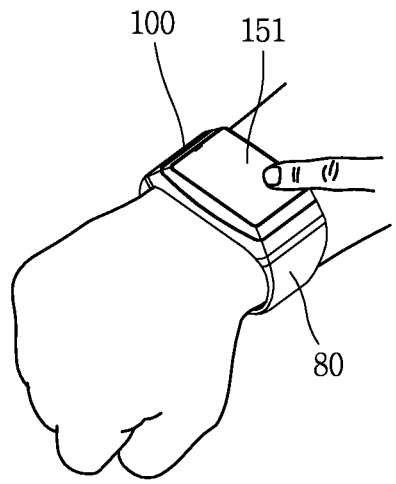
FIGS. 4A to 4F are conceptual views illustrating user's gestures for deciding a wearing position of the terminal.
Figure 4B:
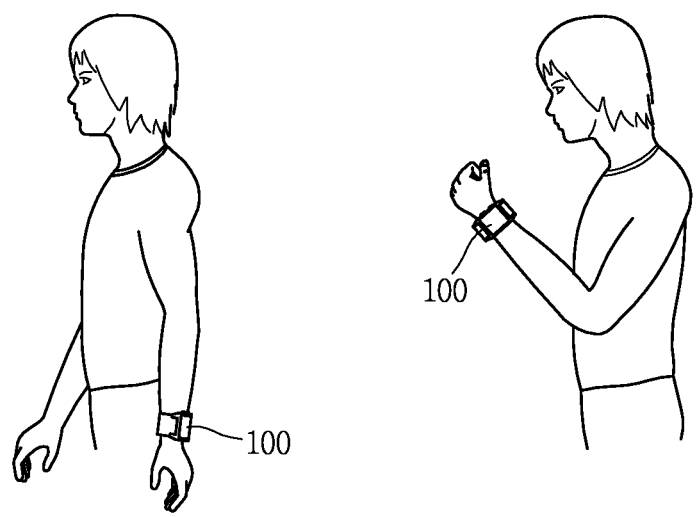
Figure 4C:
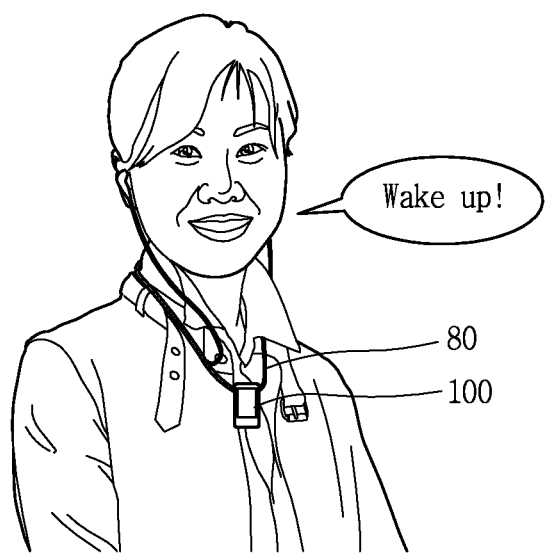
Figure 4D:
Figure 4E:
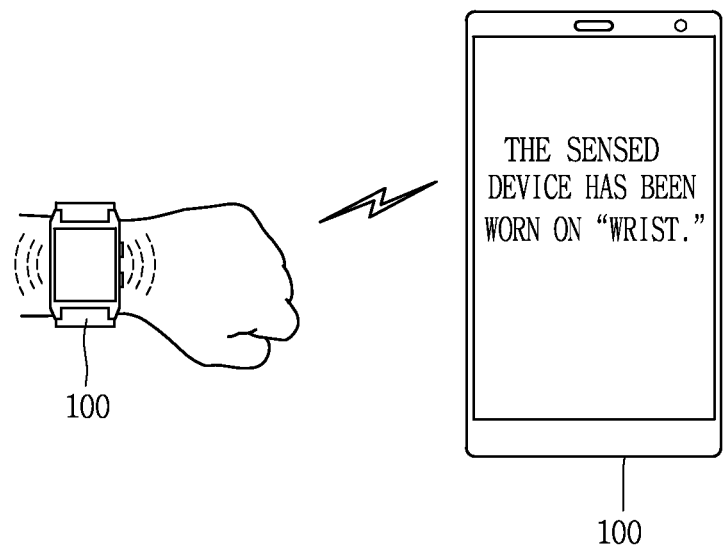
Figure 4F:
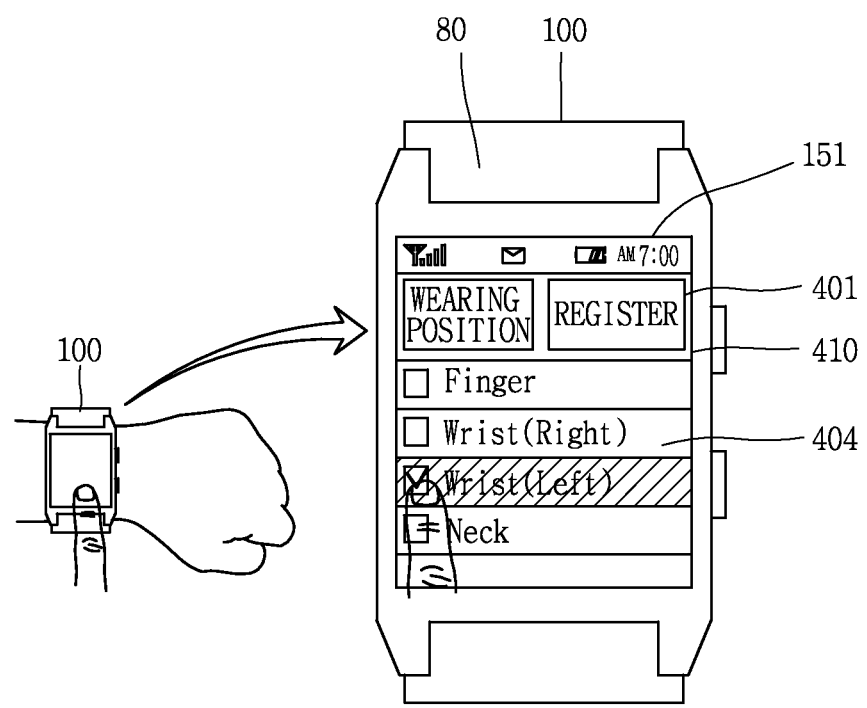

For example, referring to FIG. 4F, when the user applies a preset type of touch input after wearing the mobile terminal 100 on a wrist, a graphic user interface (GUI) screen 410 (namely, the list) for manually inputting a worn position of the main body may be output on the display unit 151. That is, the mobile terminal 100 may enter a wearing position setting mode. In the entrance state into the wearing position setting mode, when the user selects a 'Wrist (left)' item 404 on the GUI screen 410 displayed on the display unit 151 and pushes a 'Register' key 401, then the controller 180 may recognize that the mobile terminal has been worn on the user's 'left wrist.' In this case, when the user wears the mobile terminal 100 on another specific portion of the body, the user should reenter the wearing position setting mode to change the setting.

On the other hand, upon the selection of the second mode, then the controller 180, as will be described in more detail hereinafter, may decide a worn position of the main body based on a user gesture sensed by the sensing unit 140.

When the user gesture is sensed by the sensing unit 140, the controller 180 may decide the worn position of the main body according to the sensed user gesture.

Here, the user gesture may be a preset user gesture, or user gestures which are made naturally as the user manipulates the mobile terminal 100. That is, the controller 180 may or may not request the user to input an initial gesture to decide the worn position of the main body.

In case of requesting for the input of the initial gesture, when the main body of the mobile terminal 100 is worn, the controller 180 may output a message requesting for an input of a preset initial gesture. Then, when the initial gesture is input in response to the request message output, the controller 180 may analyze a sensor value of the input initial gesture and decide the worn position of the main body.

Here, a shape of the initial gesture may be pre-stored in the memory 160. The initial gesture may preferably include gestures which can be intuitively recognized by the user and sensed by the sensing unit 140. Also, the memory 160 may store, as a pair, the shape of the initial gesture and a worn position in a matching manner.

For example, the initial gesture may be a gesture, such as a preset type of touch input (for example, one of preset types of dragging, flicking, and sliding touch inputs applied to one point of the display unit 151 or the main body), an input of a preset voice command, a movement of the main body in a preset direction, an input of a preset tactile signal (or haptic signal), or the like. Also, the request for the input of the initial gesture may be carried out in various manners, such as using a text message, a voice message, a vibration signal and the like.

For example, referring to FIG. 4A, when a touch input which taps the display unit 151 of the mobile terminal 100 a preset number of times is applied, the controller 180 may recognize it as the main body has been worn on the user's wrist.

Referring to FIG. 4B, when the mobile terminal 100 determines the worn position in a manner of distinguishing a left-hand side and a right-hand side, the user gesture illustrated in FIG. 4A may first be carried out. Afterwards, a sensor value may be analyzed from a gesture of putting the wrist up as illustrated in (b) of FIG. 4B or putting the wrist down as illustrated in (a) of FIG. 4B, to determine whether the worn position of the mobile terminal 100 is the left wrist or the right wrist. The spatial movement may be sensed by the gyro sensor of the sensing unit 140.

For example, when the mobile terminal 100 has been worn on the left wrist, the sensor values sensed by the gyro sensor (not illustrated) of the sensing unit 140, namely, graphs of x-axis, y-axis and z-axis may form similar shapes in any of the cases of (a) and (b) of FIG. 4B. On the other hand, when the mobile terminal 100 has been worn on the right wrist, the sensor values sensed by the gyro sensor of the sensing unit 140, namely, graphs of x-axis, y-axis and z-axis may form different patterns in any of the cases of (a) and (b) of FIG. 4B.

As another example, referring to FIG. 4C, when a preset voice command, for example, 'wake up!' is input through the microphone 123 of the mobile terminal 100, the controller 180 may recognize it as the main body has been hung around the user's neck.

The controller 180 may also recognize the main body-worn position based on whether the connector detachably coupled to the main body comes in contact with the user's body. Here, the connector may be a connection element for mounting the mobile terminal 100 on a specific portion of the user's body, for example, have a shape of bend, string, clip, pin, adhesive or the like. Also, a predetermined sensor (not illustrated) which may sense the contact with the main body may be provided on at least part of the connector.

For example, referring to FIG. 4D, when it is sensed that a part of a connector 80, namely, a string coupled to the mobile terminal 100 has come in contact with the user's body or clothes, the controller 180 may recognize it as the main body has been hung around the user's neck.

Meanwhile, the mobile terminal 100 coupled with the connector 80 may be mounted to another portion of the user's body. Although not illustrated, a worn position of the mobile terminal 100 may be decided by considering an attribute of the connector 80. For example, when the connector 80 is the string as illustrated in FIG. 4D, the portion of the user's body on which the mobile terminal 100 has been worn may be eventually decided using a length, a thickness and a coupled position with the mobile terminal 100 of the string. For example, when the string is long, relatively thick and/or coupled to an upper end of the mobile terminal 100, the 'string' may be decided as a connector for hanging the mobile terminal around the neck.

The controller 180 may transmit a predetermined signal to a connected external device and receive a signal corresponding to the position of the body on which the mobile terminal 100 has been worn. To this end, the mobile terminal 100 may be connected with the external device through the wireless communication unit 110 so as to transmit and receive wireless signals. Here, the signal transmitted to the connected external device may be a wireless signal corresponding to a preset type of user gesture.

For example, referring to FIG. 4E, while the mobile terminal 100 is connected to an external device 400, which is spaced therefrom by a predetermined distance, when a predetermined signal is output to the exterior and received by the external device 400, the external device 400 may analyze the received signal, determine a worn position of the mobile terminal 100, and provide a signal corresponding to the determination result to the mobile terminal 100. In turn, the mobile terminal 100 may determine the worn position based on the received signal. Here, the connected external device 400 may output a term, such as 'the sensed device has been worn on a "wrist"' on a screen.

As another example, the external device 400 may determine the worn position of the main body by acquiring an image, which shows the worn state of the mobile terminal 100, using a camera equipped therein, and transmit a wireless signal corresponding to the determination result to the mobile terminal 100.

In the meantime, when there is not any request for inputting the initial gesture for deciding the worn position of the mobile terminal 100, the controller 180 may decide the worn position of the main body by monitoring user inputs applied to the mobile terminal 100 for a preset time. Here, the preset time may be in the range of several seconds to several minutes, or may be set or changed by a user input.

Next, the controller 180 may decide the worn position of the main body based on an input pattern which is generated according to the monitoring result. In detail, the controller 180 may decide the worn position of the mobile terminal 100 by comparing a pre-stored input pattern for each worn position with the generated input pattern.

As such, when the worn position of the mobile terminal 100 is decided based on the initial gesture input or the pattern of the inputs applied for the preset time, the controller 180 may set a user input for generating a first control command, in a different manner, based on the decided worn position (S303).

Here, the first control command may include any control command which is generated through a preset type of touch input. For example, the first control command may be an execution command of an application, a command to be output to an output unit (for example, a screen, a speaker etc.), a predetermined control command for changing a current state into another state, or the like.

The setting of the user input in the different manner may indicate that the user input changes to allow the user to conveniently control the main body according to the main body-worn position because an environment changes depending on the worn position of the mobile terminal 100.

In detail, when an input key for generating a control command is output on the display unit 151, a display region of the input key may preferably be arranged in a different manner according to the worn position of the mobile terminal 100. Also, when the main body is worn on a position at which the display unit 151 is difficult to be manipulated or the mobile terminal 100 is rarely exposed, a touch input manner may be restricted and instead of it, a voice input manner may be employed.

Hereinafter, description will be given of an example in which a screen-displaying direction is changed according to a worn position of the mobile terminal 100 with reference to FIGS. 5A to 5D.

FIGS. 5A to 5D are conceptual views illustrating the change in an arrangement of a display region for screen information and an input region for inputting a control command, according to a left/right wrist when the terminal is worn on the user's wrist.

Hereinafter, description will be given under the assumption that the mobile terminal 100 according to the exemplary embodiment is equipped with a touch sensor, and includes the display unit 151 divided into a first region and a second region, which are separate from each other.

Here, the first region may be a region for outputting predetermined screen information, and the second region may be a region for inputting a first control command in order to control the screen information output on the first region. Also, the first region may be a display region for displaying a graphic object including touch keys, and the second region may be a non-display region on which any screen information is not usually displayed. Also, the second region on which predetermined keys are output to control screen information may be provided in plurality.

Here, the screen information is a graphic image or a GUI which can be output on the display unit 151, and may be output regardless of its type. For example, first screen information output on the display unit 151 may be an execution screen of an application, which is currently activated in the mobile terminal, of applications installed in the mobile terminal.

In such form of the display unit 151, the controller 180 may control the display unit 151 in such a manner that the first and second regions of the display unit 151 can be arranged in a different manner according to the decided worn position of the main body.

Figure 5A:
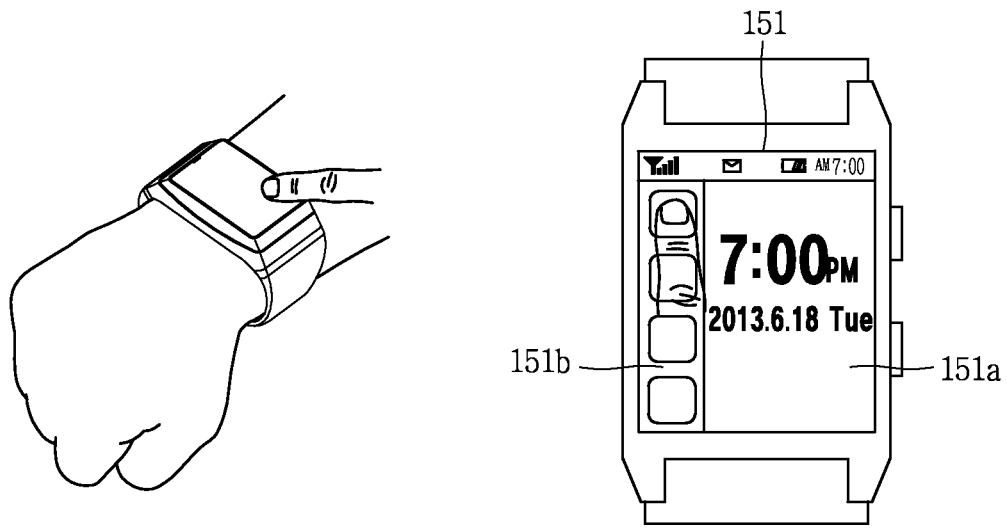
FIGS. 5A to 5D are conceptual views illustrating the change in arrangements of a display region of screen information and an input region for inputting a control command, according to a left/right wrist when the terminal is worn on the user's wrist.
Figure 5B:
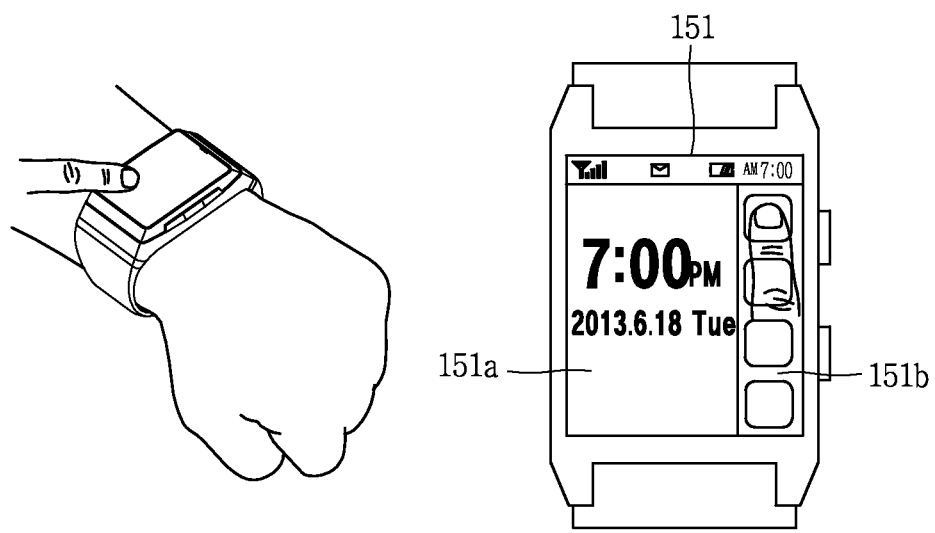
Figure 5C:
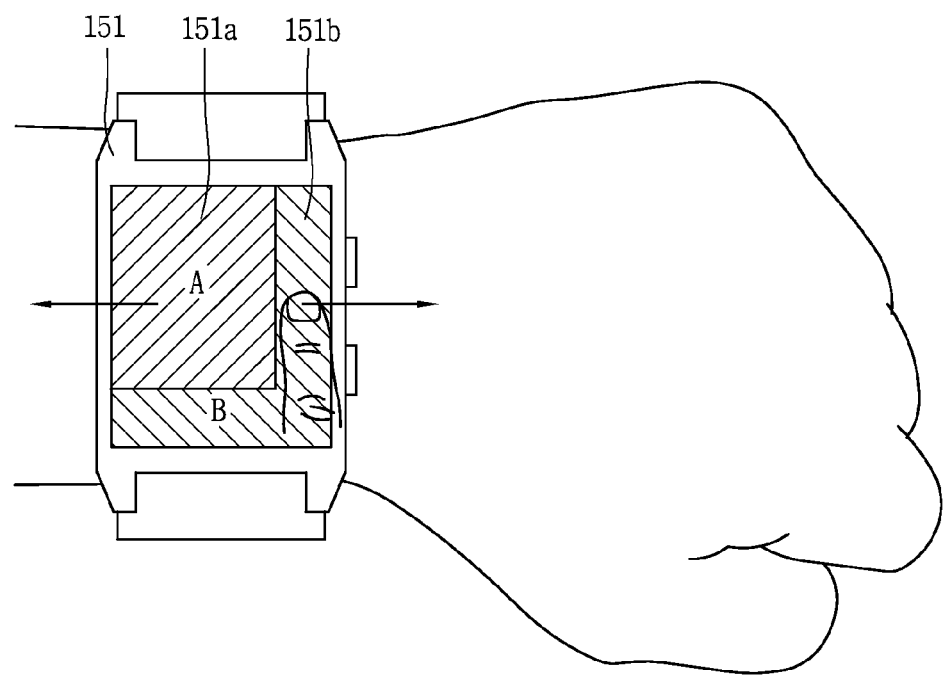
Figure 5D:
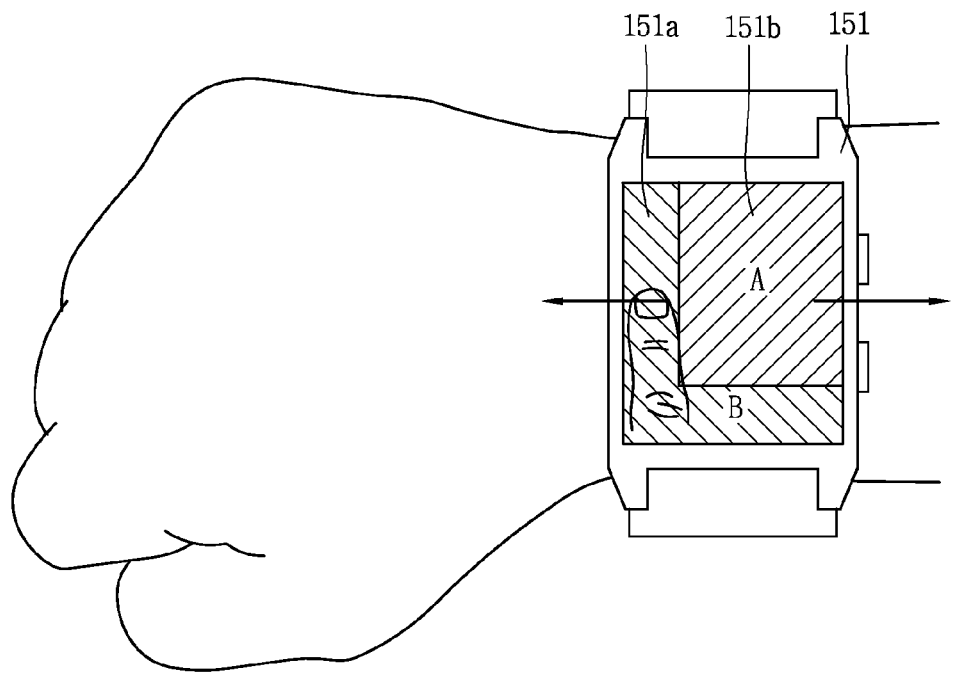

FIGS. 5B and 5C illustrate an example that the mobile terminal 100 has been worn on the left wrist, and FIGS. 5A and 5D illustrate an example that the mobile terminal 100 has been worn on the right wrist.

In detail, as illustrated in FIGS. 5B and 5C, when the main body is worn around the left wrist, the controller 180 may control the first region 151a for outputting screen information to be arranged based on a left side of the display unit 151, and the second region 151b, on which predetermined keys for controlling the screen information are output, to be arranged based on a right side of the display unit 151 (for example, a right region and a lower region of the screen).

Also, referring to FIGS. 5A and 5D, when the main body is worn around the right wrist, the controller 180 may control the first region 151a for outputting the screen information to be arranged based on the right side of the display unit 151, and the second region 151b, on which the predetermined keys for controlling the screen information are output, to be arranged based on the left side of the display unit 151 (for example, a left region and a lower region of the screen).

According to the structure, when the user applies a predetermined touch input by using the other wrist, on which the mobile terminal 100 has not been worn, in order to change a state of screen information output on the display unit 151, the output screen information may be controlled and changed without being obscured. This may result in an improvement of user convenience.

Also, referring to FIG. 5C, when the user applies a preset touch input to screen information A, which is displayed on the first region, in a left-hand direction (namely, in a direction toward a shoulder) based on the display unit 151, using a right hand without the mobile terminal 100 worn, the controller 180 may project a screen corresponding to the screen information A onto one region of the left direction (namely, the direction toward the shoulder) through a projection unit (not illustrated). In the meantime, the projected screen may be a screen whose output range extends from the screen information A or a screen whose full size extends. When the user applies a preset touch input to at least one of keys B, which are displayed on the second region, in a right-hand direction (namely, a direction toward the back of the user's hand) based on the display unit 151, using the right hand without the mobile terminal 100 worn, the controller 180 may project the at least one of the keys B onto one region of the right-hand direction (namely, the direction toward the back of the user's hand) through the projection unit (not illustrated).

Here, the projection unit may carry out the same or similar function to a projector, a beam, or a bean projector. The projection unit may be integrally coupled to the mobile terminal 100 or an independent device which is connected to the mobile terminal 100.

Here, the preset touch input may be a dragging, sliding or flicking touch input which moves from one point of the display unit toward a position where the projection unit 156 is located. In addition, the preset touch input may be a touch input that the aforementioned dragging, sliding or flicking touch is applied faster than a reference speed.

In such a manner, a direction of displaying a screen may be changed according to a position of a wrist on which the mobile terminal 100 is worn. This may arouse a convenient manipulation and an effect as if the display unit 151 is enlarged in size.

Hereinafter, description will be given of a control method of a mobile terminal for outputting a different execution result according to a worn position of the mobile terminal according to the exemplary embodiment disclosed herein when the mobile terminal is worn on a part of a user's body, with reference to FIG. 6.

Figure 6:
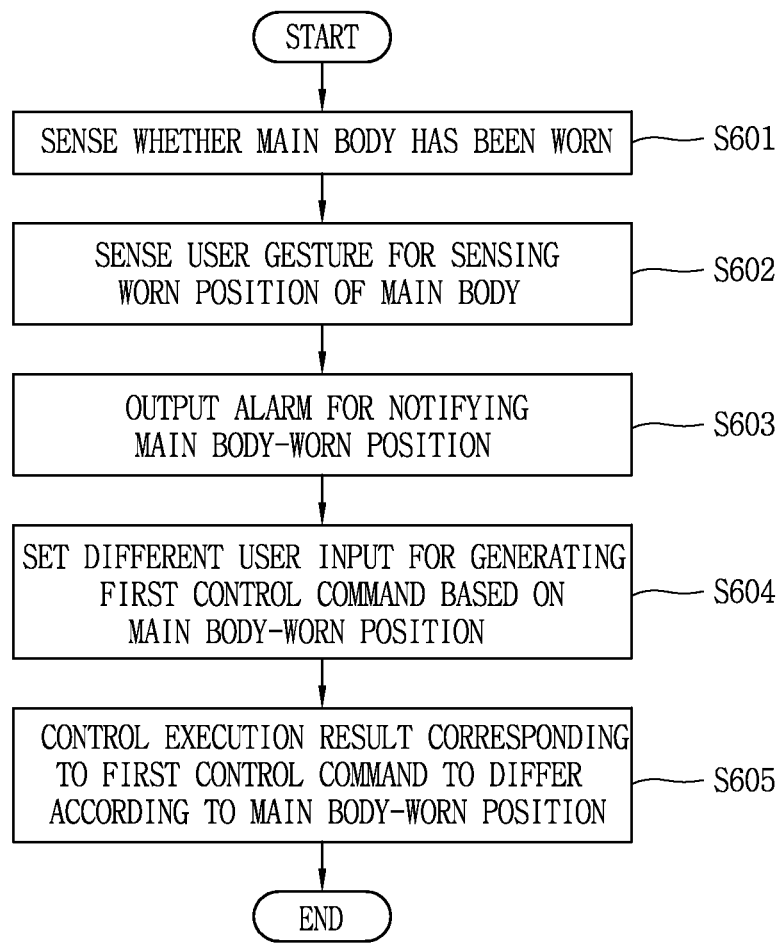
FIG. 6 is a flowchart illustrating a control method for a mobile terminal in accordance with another exemplary embodiment of the present disclosure.

FIG. 6 is a flowchart illustrating a control method for a mobile terminal in accordance with another exemplary embodiment of the present disclosure.

First, it is premised that the mobile terminal 100 (see FIG. 1) according to the exemplary embodiment disclosed herein can be transformed into a glass type which is wearable on user's eyes, a watch type which is wearable on a wrist, a necklace type which may be hung around the user's neck, a ring type which may be put on the user's finger, a forearm type which is wearable on the forearm, an accessory type which may be worn on the user's clothes, and the like (however, the present disclosure may not be limited to those). Also, for the transformation, the main body of the mobile terminal 100 may be coupled to at least one connector (for example, a bend, a hook, a pin, an adhesive, etc.)

Referring to FIG. 6, the sensing unit 140 (see FIG. 1) of the mobile terminal 100 (see FIG. 1) may sense wearing of the main body on a part of the user's body (S601).

In detail, the sensing unit 140 may sense whether or not the main body of the mobile terminal has been worn in a manner of sensing an inclination and a movement of the main body of the mobile terminal 100. Or, the sensing unit 140 may recognize a user's location and a worn state of the main body of the mobile terminal 100 based on an image captured by the camera 121. Or, in a state where the mobile terminal 100 is connected to at least one connector to be worn on the user's body, when the connector comes in contact with the user's body or one end and another end of the connector are connected to each other, the sensing unit 140 may recognize it as the main body has been worn on the part of the user's body. Or, the sensing unit 140 may sense the worn state of the main body, as a response, when the user pushes a predetermined key or inputs a predetermined voice command after wearing the main body, or as a response to a user's reaction according to guide information output through the display unit 151 or the audio output module 153 of the mobile terminal 100.

When the main body of the mobile terminal 100 has been worn, the sensing unit 140 may sense a user gesture for sensing a worn position of the main body (S602).

When the user gesture is sensed by the sensing unit 140, the controller 180 may decide the worn position of the main body according to the sensed user gesture.

The user gesture for deciding the worn position of the main body may be a predetermined user gesture or user gestures which are made naturally in response to the manipulation of the mobile terminal 100. That is, the controller 180 may request or not request the user to input the initial gesture to decide the worn position of the main body.

In detail, when the input of the initial gesture for deciding the worn position of the mobile terminal 100 is requested, the controller 180 may output a message requesting for an input of a preset initial gesture after the main body of the mobile terminal 100 is worn. The controller 180 may then decide the worn position of the main body by analyzing a sensor value of the input initial gesture when the initial gesture is input in response to the output request message.

On the other hand, when the input of the initial gesture for deciding the worn position of the mobile terminal 100 is not requested, the controller 180 may decide the worn position of the main body by monitoring user inputs applied to the mobile terminal 100 for a preset time. The description thereof has been given in detail as aforementioned, so the detailed description will be omitted.

In this manner, when the worn position of the mobile terminal 100 is decided based on the initial gesture input or the pattern of inputs applied for the preset time, the controller 180 may output a preset alarm notifying the decided worn position (S603).

Here, an output method of the alarm may not be limited. For example, the output of the alarm may be carried out in at least one manner of outputting a message, in which the main body-worn position is indicated using a text or image, on the display unit 151, outputting a voice message through the audio output module 153, outputting both the voice message and a haptic signal, or further outputting a highlighting effect on a screen.

When the alarm for the main body-worn position is output, the controller 180 may set a user input for generating a first control command in a different manner based on the decided worn position (S604).

Here, the first control command may include any control command which is generated by a preset touch input. For example, the first control command may be an activation command of an application, a command to be output to an output unit (for example, a screen, a speaker, etc.), or a predetermined control command for changing a current state into another state.

The setting of the user input in the different manner may indicate that the user input changes to allow the user to conveniently control the main body according to the main body-worn position because an environment changes depending on the worn position of the mobile terminal 100.

The controller 180 may then control an execution result corresponding to the first control command to be displayed in a different manner based on the main body-worn position (S605).

In detail, the controller 180 may display first screen information in response to a first input applied in a state where the mobile terminal 100 has been worn on a first position of the user's body. On the other hand, when the same first input is applied while the mobile terminal 100 is worn on a second position of the body, the controller 180 may output second screen information, which is different from the first screen information, or change a state of the first screen information (for example, changing an activated state into a deactivated state). That is, a different execution result may be output with respect to the same input according to the worn position of the mobile terminal 100.

On the contrary, the same execution result may also be output with respect to different inputs according to the worn position of the mobile terminal 100.

Figure 7A:
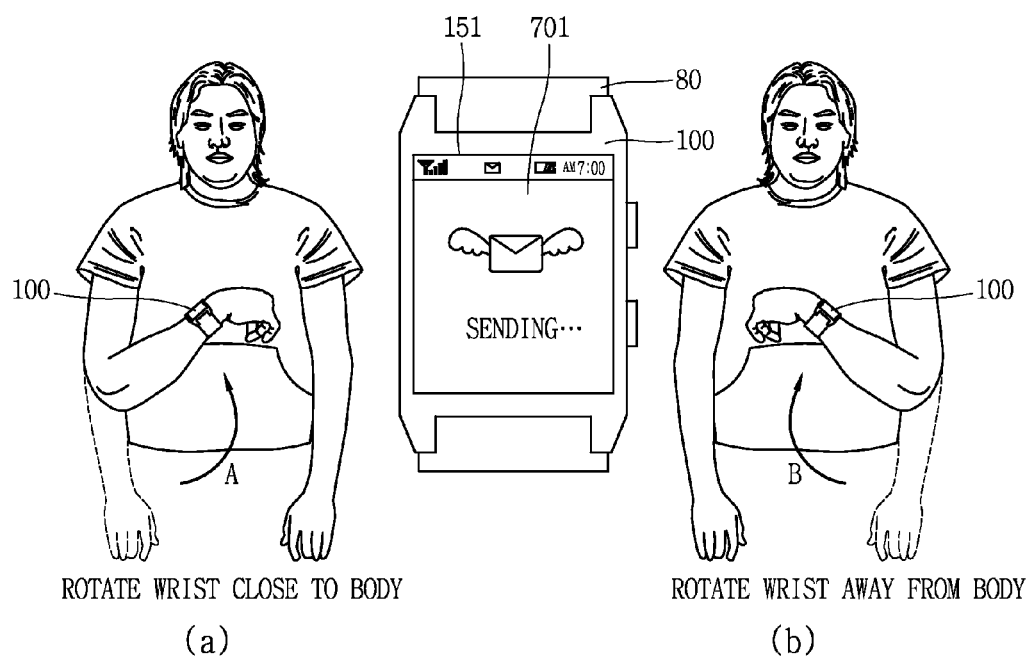
FIGS. 7A and 7B are conceptual views illustrating the output of the same execution result with respect to different inputs for maintaining input consistency when the mobile terminal is worn on the user's left/right wrist.
Figure 7B:
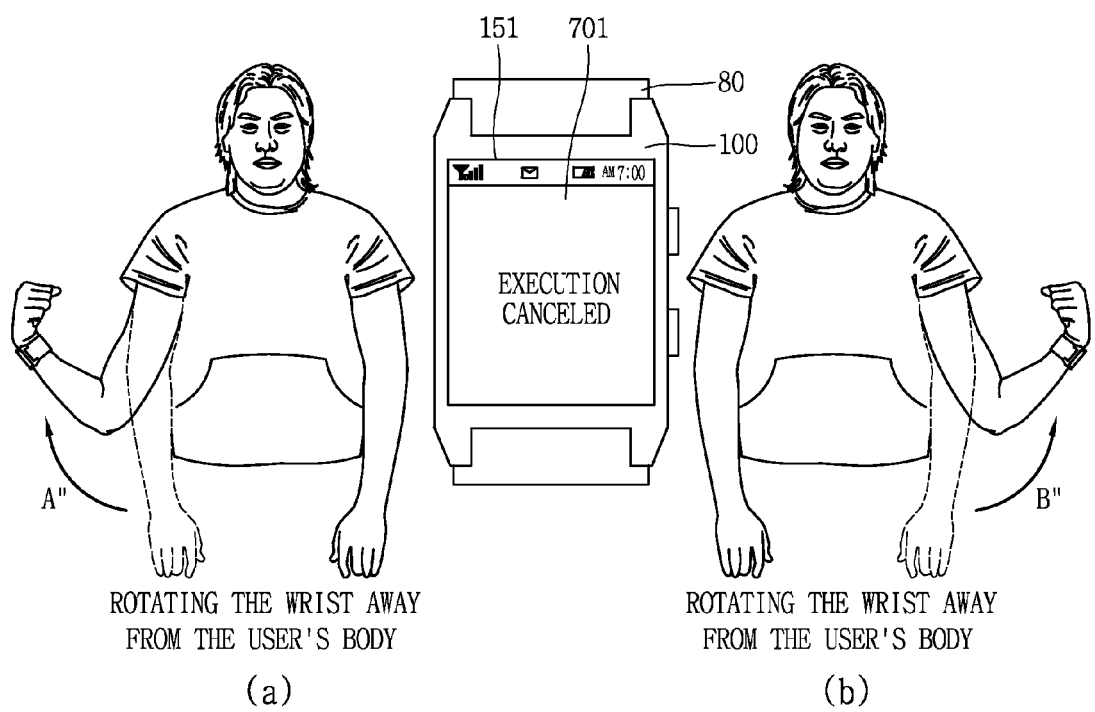

FIGS. 7A and 7B are conceptual views illustrating the output of the same execution result with respect to different inputs for maintaining input consistency when the mobile terminal is worn on the user's left/right wrist.

As aforementioned, for the user's convenience, the case where the mobile terminal is worn on the user's left wrist and the case where the mobile terminal is worn on the user's right wrist may be distinguished from each other.

For example, in case where the user wears the mobile terminal 100 on a wrist and makes a gesture (or a motion) of rotating the wrist toward the user's body, when the main body is worn on a left wrist, a sensor may sense it as a clockwise rotation ('first sensor value'), and when the main body is worn on a right wrist, the sensor may sense it as a counterclockwise rotation ('second sensor value'). However, even in these cases, it may be more intuitive and convenient for the user to recognize those rotations as the rotation toward the body, regardless of the position of the wrist on which the mobile terminal 100 is worn.

Accordingly, in this exemplary embodiment, when the main body of the mobile terminal 100 is worn around the user's left or right wrist, the controller 180 may output an execution result corresponding to the first control command, in response to a user gesture of rotating the main body worn-wrist (regardless of the left or right wrist) close to the user's body. Also, the controller 180 may output an execution result corresponding to a second control command, in response to a user gesture of rotating the main body-worn wrist (regardless of the left or right wrist) away from the user's body.

To this end, the sensing unit 140 of the mobile terminal 100 may compensate for the sensor value of the sensed gesture such that the same control command can be input, when the main body is rotated toward the body regardless of the clockwise rotation or the counterclockwise rotation of the main body. The compensation may also be carried out by the controller 180.

For example, referring to FIG. 7A, in a state where the user wears the mobile terminal 100 on the right wrist as illustrated in (a) of FIG. 7A or on the left wrist as illustrated in (b) of FIG. 7A, when a user operation of rotating the wrist toward the body (in a direction A or a direction B) even in any case, the same execution result may be output, for example, a transmission of a written instant message may be carried out and a message transmission screen 701 may be output on the display unit 151.

Also, referring to FIG. 7B, in a state where the user wears the mobile terminal 100 on the right wrist as illustrated in (a) of FIG. 7B or on the left wrist as illustrated in (b) of FIG. 7B, when a user operation of rotating the wrist away from the body (in a direction A" or a direction B") even in any case, the same execution result may be output, for example, an operation of canceling a pre-executed command may be carried out and a previous screen 701 corresponding to the cancelation of the operation may be output on the display unit 151.

Hereinafter, description will be given of an example in which a size and an output range of an object output on the display unit 151 differ according to the worn position of the mobile terminal 100, with reference to FIGS. 8A and 8B.

In detail, when the decided worn position of the main body is a first position, the controller 180 may output an object, which is displayed on the display unit 151, in an enlarging manner. On the other hand, when the decided worn position is changed from the first position into a second position, the controller 180 may reduce the size of the object displayed on the display unit 151 and extend an output range of information.

Here, the first position, for example, may be a portion of a body, at which it is difficult to manipulate the display unit 151, for example, a neck, a leg, or the like. Also, the second position may be a portion of the body at which it is easy to manipulate the display unit 151, for example, a wrist, both eyes, a head, or the like.

Figure 8A:
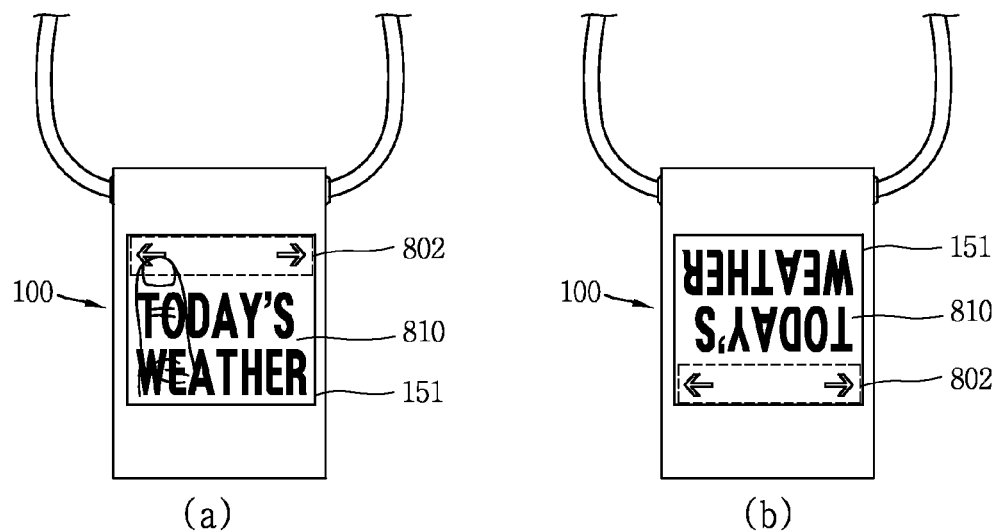
FIGS. 8A and 8B are conceptual views illustrating changes in a size and an output range of an object displayed on a display unit according to a worn position of the mobile terminal.

For example, referring to (a) of FIG. 8A, as for a necklace type mobile terminal 100, it may be far apart from the user's eyes and the user may feel inconvenient in staring it for a long time. Therefore, an object, namely, a text included in the screen information 810 output on the display unit 151 may be displayed in an enlarged size. Here, in order to display information which has not been output on the screen, an indicator 802 for changing (scrolling) the screen output according to a preset touch input may further be displayed on one region (for example, an upper end) of the display unit 151. Meanwhile, in another example, the screen information output on the display unit 151 may be scrollable in a preset direction and at a predetermined speed, or be scrollable by tracking the user's eyes through cameras.

On the other hand, referring to (b) of FIG. 8A, as for the necklace type mobile terminal 100, it may be convenient for the user to see the display unit 151 by dropping the head. When such environment is sensed by the sensing unit 140, the controller 180 may output the screen displayed on the display unit 151 in such a manner of turning the screen upside down. Accordingly, screen information 810" and an indicator 802" which have been turned upside down may be output.

Figure 8B:
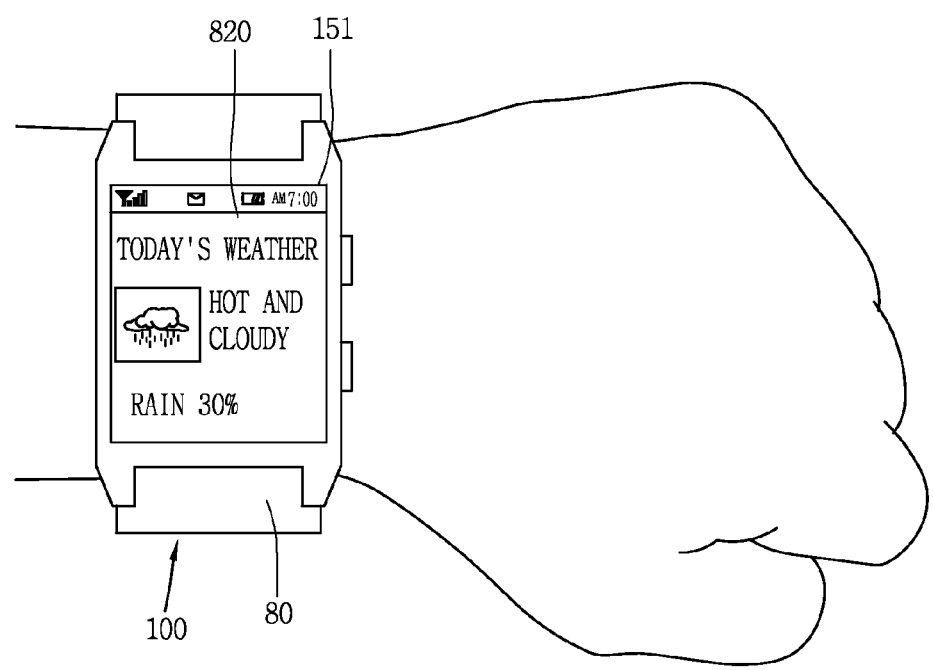

For example, referring to FIG. 8B, as for a watch type mobile terminal 100, it may be easy to check or manipulate information displayed on the display unit 151. This may allow much more information than those illustrated in FIG. 8A to be included in screen information 820 output on the display unit 151. Also, a size-reduction of an object and an addition of various images may be allowed.

Although not illustrated, the controller 180 may activate or deactivate a specific screen or a specific function according to the worn position of the mobile terminal 100.

As one example, a screen state may differ according to the worn position of the mobile terminal 100.

In detail, the controller 180 may control the display unit to change a screen of a lock state, in which an input of a control command with respect to an application is restricted, according to the decided worn position. Also, the controller 180 may control the display unit 151 to output a different idle screen according to the decided worn position when a control command for unlocking the lock state is input.

For example, when the watch type mobile terminal 100 is worn on a wrist, the display unit 151 can be frequently checked or manipulated by the user, and accordingly various information (for example, time information, weather information, etc.) may be displayed on an idle screen. Also, it may be allowed to output an icon of at least one executable application even on a screen which is in a lock state.

On the other hand, when the necklace type mobile terminal 100 is hung around the neck, a frequent check of the display unit 151 may not be done. Therefore, an idle screen may be set in a sleep mode to reduce a battery consumption or an aesthetic screen may be output due to being greatly exposed to the exterior. Also, only a minimal indicator (for example, 'lock' image) may be displayed on the screen which is in the lock state.

As such, various idle screens and lock screens may be previously stored in the memory 160. When the worn position of the main body is decided, the controller 180 may extract those screens from the memory 160 to display on the display unit 151.

Also, as one example, a function to be activated may differ according to the worn position of the mobile terminal 100.

In detail, the controller 180 may activate a first function corresponding to a first input when the terminal-worn position is a first position. While the first function is in the active state, when the main body-worn position is changed from the first position into a second position, the controller 180 may deactivate the first function corresponding to the first input.

For example, a message preview function may be activated when the mobile terminal 100 is worn on a wrist which is relatively less exposed to others. In this state, when the worn position of the mobile terminal is changed into the user's neck, the mobile terminal 100 may be relatively greatly exposed to others, and accordingly the message preview function may be deactivated. Meanwhile, the activation/deactivation of the function may be set or changed by a user input.

Hereinafter, description will be given of a change in a method of processing a received event according to the worn position of the mobile terminal 100, with reference to FIGS. 9A to 9C.

After the mobile terminal 100 according to the exemplary embodiment is worn on a specific portion of the user's body and the worn position is sensed, when a specific event is received, the controller 180 may change whether or not to output event information related to the received event and a notification of the reception according to the decided worn position. Also, the notification method (for example, outputting vibration, sound, highlighting effect on a screen, etc.) may differ according to the main body-worn position.

Here, the term 'event' refers to affecting an operation of at least one application installed in the terminal, changing an item of a database (or a data file) associated with the at least one application, or generating data transmission and reception with an external terminal or an external network through the at least one application. For example, the event may include 'call reception,' 'message reception,' and the like.

Figure 9A:
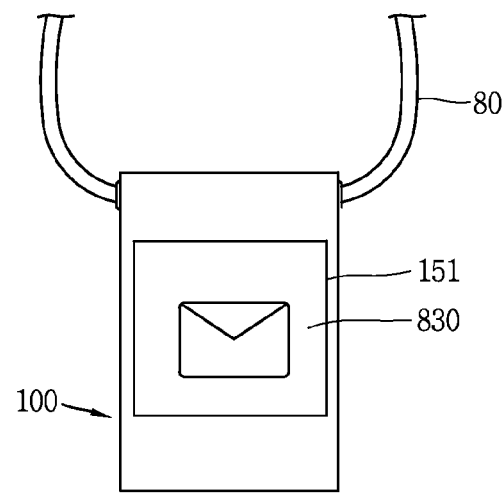
FIGS. 9A to 9C are conceptual views illustrating a change in a processing manner upon reception of an event according to a worn position of the mobile terminal.

For example, referring to FIG. 9A, after it is sensed that the necklace type mobile terminal 100 has been hung around the neck, when a message is received, only a message reception notification 830 may be output, so as to prevent an exposure of the message to others and allow for checking the message even by use of a different component other than the display unit 151.

Figure 9B:
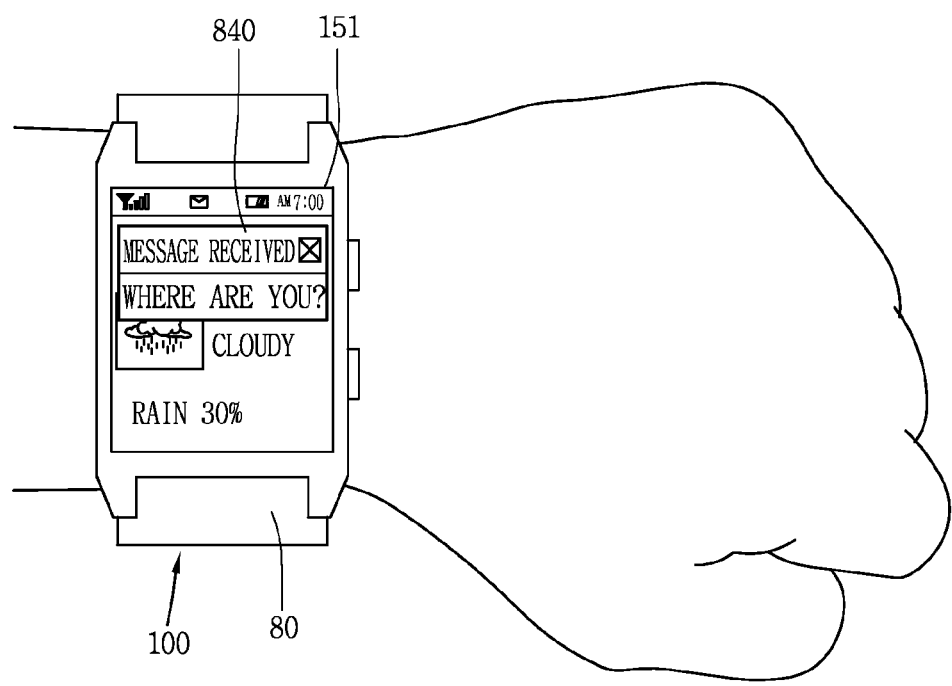

As another example, referring to FIG. 9B, after it is sensed that the watch type mobile terminal 100 has been hung around the neck, when a message is received, a popup window 840, which shows a notification of the message reception and the received message, may be output on one region of the display unit 151 because of relatively less concerns about an exposure to others and a frequent manipulation of the display unit 151.

On the other hand, as for the watch type mobile terminal 100 illustrated in FIG. 9B, the display unit 151 may be configured as a flexible display unit which can be bent to cover at least one portion of a wrist. In this case, the controller 180 may output screen information indicating event information on one region of the display unit, in response to a preset touch input applied to a state display bar, which indicates a reception of the event. The screen information may be output on a flat position according to a movement of the wrist.

Also, as for the watch type mobile terminal 100 illustrated in FIG. 9B, in a state where it is sensed that the watch type mobile terminal 100 has been worn around the wrist, when a tap gesture of tapping the display unit 151 or the main body a preset number of times is applied, various user interfaces may be provided. Here, the tap gestures may be touches applied in a consecutive manner for a preset time, and touch-applied points may also be sensed. Also, an object for applying the tap gestures may be various, such as a finger, a pen, a pointer, a fist, a palm, and the like.

Figure 9C:
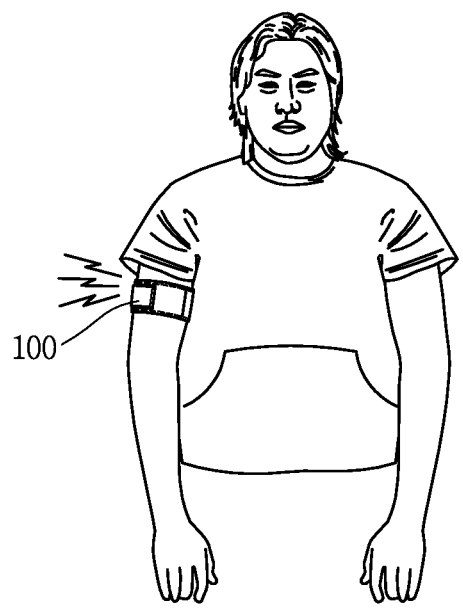

For example, referring to FIG. 9C, after it is sensed that a forearm type mobile terminal 100 has been worn around a forearm, when a message is received, a message reception notification may be output only in a vibrating manner (namely, using a haptic signal) because the user is generally exercising in many cases.

As described above, the output method, the display range, and the activated function, which correspond to the control command, may differ according to a position where the mobile terminal 100 is worn on the user's body, which may result in providing more intuitive, optimized user environments.

Meanwhile, the sensing unit 140 of the mobile terminal 100 may also sense a removed (released) state of the main body as well as the worn state of the main body.

When it is sensed that the main body has been removed from the user's body, the controller 180 may recover the method of applying the user input for generating the first control command into the initial state. On the other hand, when the worn position has been sensed by a manual input, the setting should be changed by a manual input.

After sensing the removal of the worn main body, when a predetermined event is received, the controller 180 may set event information related to the received event to be output in a form of sound. That is, even when the event reception notification is output in the form of 'vibration,' in the worn state of the main body, the event reception notification may be output only in the form of 'sound' when the worn state is released.

Also, as described above, according to the one exemplary embodiment, when it is determined that the user has waken up earlier than a preset alarm time in a manner of receiving a biological signal sensed by the terminal worn on a specific portion of the user's body and/or receiving the user's biological signal from a device which is wearable on a specific portion of the user's body, a morning alarm function for today may be deactivated. This may improve user convenience in view of no interference with the user or a third party due to unnecessary ringing of an alarm sound or no need to separately release the alarm function after the user wakes up.

Hereinafter, description will be given of a control method of the mobile terminal 100 (see FIG. 1) in accordance with one exemplary embodiment, with reference to FIG. 10 and FIGS. 11A and 11B.

Here, the mobile terminal 100 may perform transmission and reception of signals with a device worn on a specific portion of the user's body through short-range wireless communication. The mobile terminal 100 may also sense whether or not the device has been worn, and transmit a predetermined signal to the device in response to a signal transmitted from the worn device. Also, the device may have a shape to be wearable in a contact state on a specific portion of the user's body, such as the user's head, shoulder, wrist, neck, arm, leg, waist, or the like, or a shape to be mounted to the user's clothes.

Figure 10:
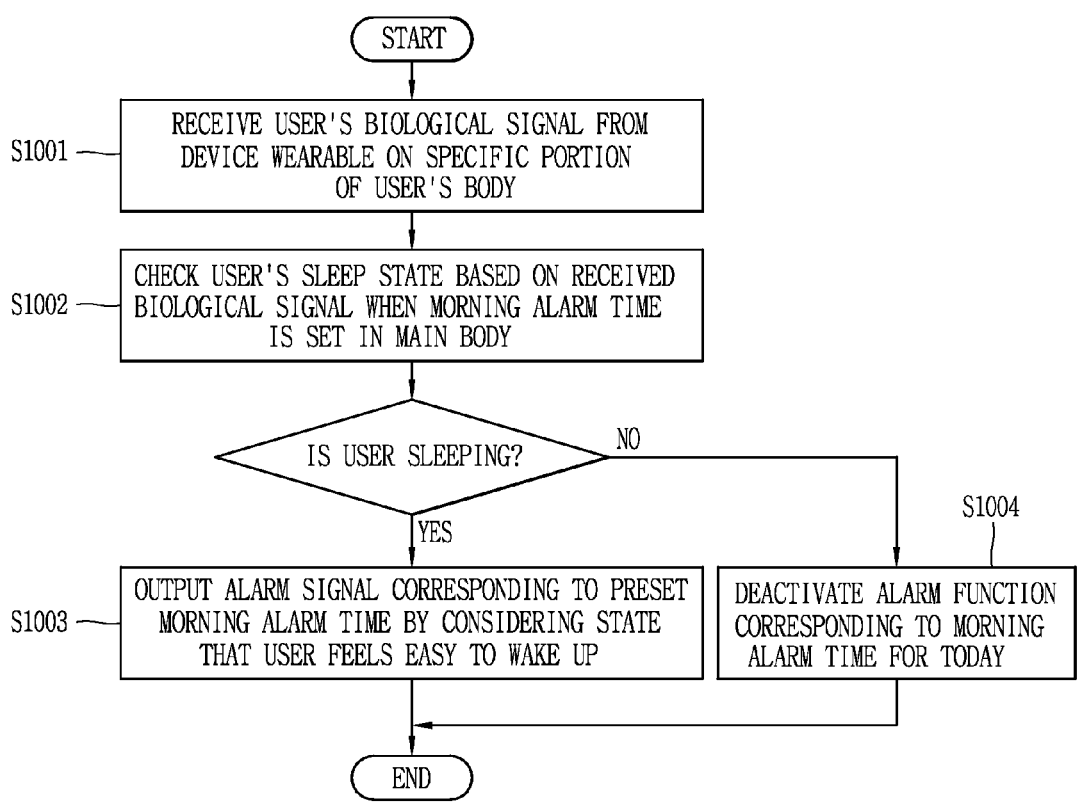
FIG. 10 is a flowchart illustrating a control method of a mobile terminal in accordance with one exemplary embodiment of the present disclosure.

Referring to FIG. 10, first, the mobile terminal 100 may receive a user's biological signal from a device, which is wearable on a specific portion of the user's body, through the wireless communication unit 110 (S1001).

Here, the biological signal, for example, may be, but not limited to, at least one of an electrocardiogram (ECG) signal, a photoplethymogram (PPG) signal or a galvanic skin response (GSR) signal. The biological signal may include every type of signal which is widely used in this field for measuring a steep stage.

Also, the device may be mounted to the specific portion of the user's body (here, the device should be mounted to a position at which the user's biological signal can be sensed), so as to sense the user's biological signal and then transmit the sensed biological signal to the mobile terminal 100 or process the signal directly. That is, the device may process all or part of the sensed biological signal, if necessary.

Figure 11A:
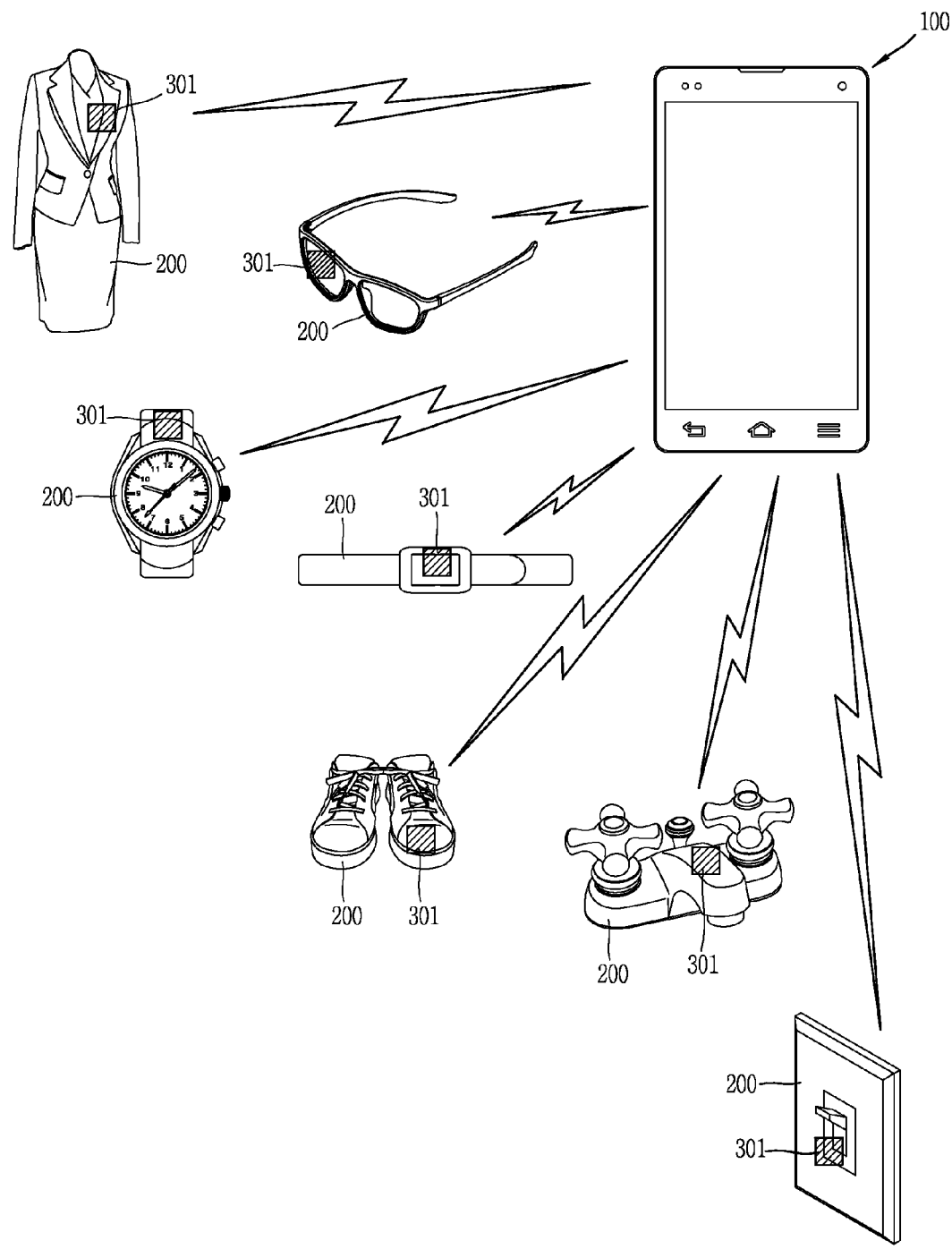
FIGS. 11A and 11B are conceptual views illustrating the flowchart of FIG. 10.

For example, referring to FIG. 11A, the device which transmits the user's biological signal through the wireless communication with the mobile terminal 100 may, as illustrated, include a signal measuring module 301. The device having the signal measuring module 301 is mostly produced to be wearable on a part of the user's body, such as a user's clothes, watch, glasses, belt, shoe and the like, but if necessary, it may be configured to sense an operation signal of a home appliance, other than the biological signal, by being mounted to the home appliance, such as a tap, a light switch and the like. In this case, the signal measuring module 301 may monitor whether or not the home appliance operates, so as to check the user's sleep state, as will be explained herebelow.

The controller 180 may also check the user's sleep state, as will be explained herebelow, by taking into account only a signal received from one device, or all of signals received from a plurality of devices.

Meanwhile, there may be various methods by which the device senses the user's biological signal.

For example, there may be a method of electrically measuring the user's biological signal through an electrode which is contactable with the user's tissue. As another example, there may be another method of measuring the user's biological signal using light or an RF signal which is emitted from a predetermined measurement module disposed in the device, or light or an RF signal which is reflected or dispersed after being transmitted into the user's body.

Also, the wireless communication unit 110 may receive the biological signal from the device using short-range wireless communication technologies, such as Wireless LAN (WLAN), BLUETOOTH™, Ultra-WideBand (UWB), Infrared Data Association (IrDA), Home Phoneline Networking Alliance (HPNA), Shared Wireless Access Protocol (SWAP), IEEE1394, and the like.

To this end, the controller 180 may transmit a signal to the device so as to request for transmission of the sensed user's biological signal. The transmission of the request signal may be carried out based on a preset reference (criterion), for example, based on a preset morning alarm time, as will be explained later.

Meanwhile, as illustrated in the exemplary embodiments of the present disclosure, in order to control the alarm function of the mobile terminal 100 based on the user's biological signal, it should be premised that the device which is configured to measure the user's biological signal is mounted on a part of the user's body.

For this, the sensing unit 140 of the mobile terminal 100 may sense whether or not the device has been worn on the part of the user's body according to reception or non-reception of the biological signal from the device.

In detail, once the biological signal is received from the wireless communication unit 100 in any manner, the sensing unit 140 may sense it as the device has been worn on the part of the user's body. On the other hand, when any signal is not received in spite of the request for transmitting the signal, the sensing unit 140 may sense it as the device has not been worn on the user's body. As another example, a connector integrally coupled to the device may be determined as not being worn on the user's body when a signal corresponding to 'open state' is sensed, and determined as being worn on the user's body when a signal corresponding to 'closed state' is sensed.

When the wearing of the device is sensed, the controller 180 may display a first icon indicating the sensed result on a display unit 170. The first icon may disappear from the display unit 170 after being output only for a preset time.

When the removal (release) of the worn device is sensed, the controller 180 may display a second icon, which is visually different from a first icon, on the display unit 170, or may not display anything on the display unit 170.

Figure 11B:
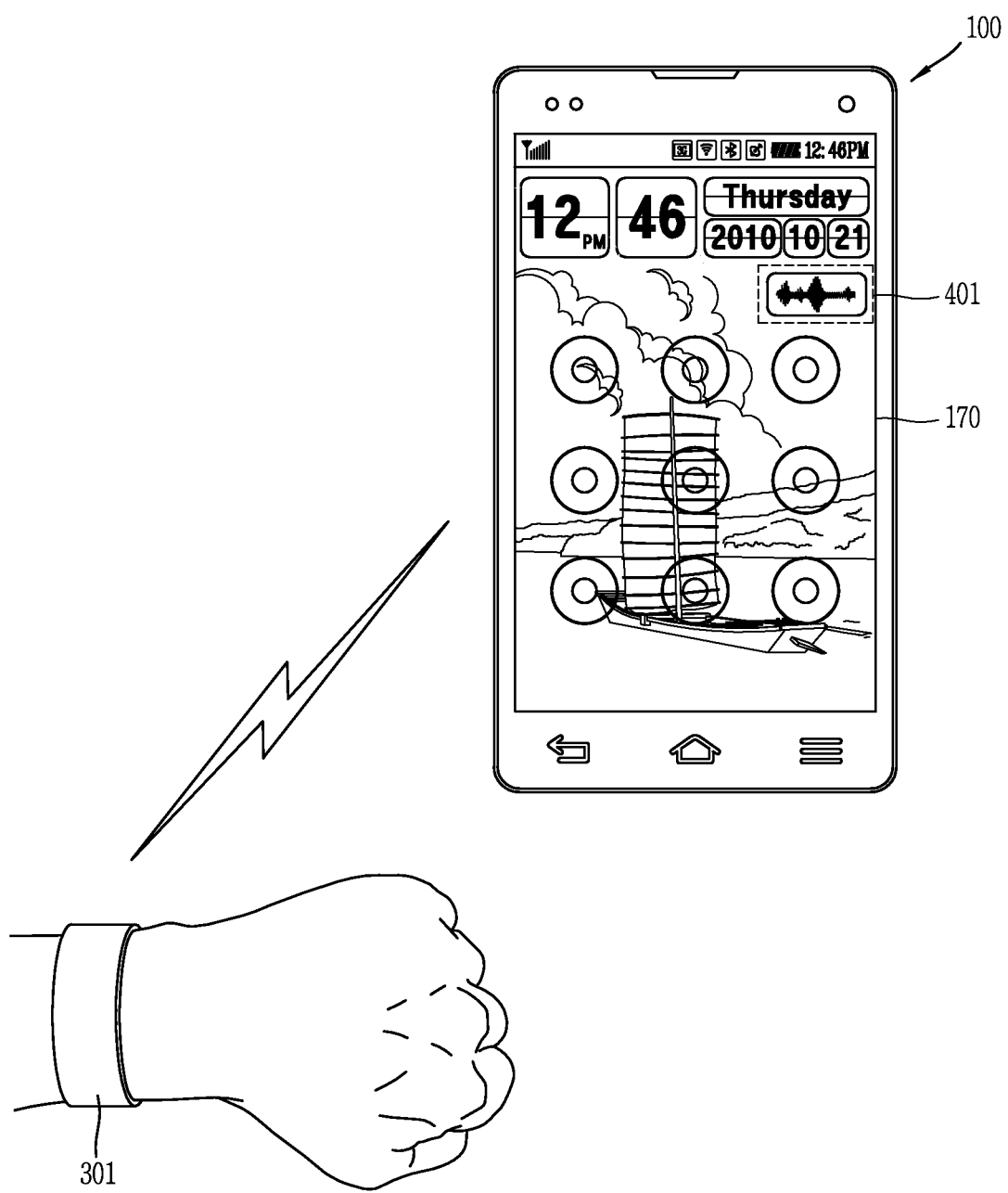

For example, referring to FIG. 11B, when the user has worn the biological signal measuring module 301 (in this case, the biological signal measuring module 301 may be used as the same meaning as the device) in the form of covering a wrist, an icon 401 which indicates the wearing of the device and an ongoing reception of the biological signal may be output on a screen of the display unit 170 of the mobile terminal.

Meanwhile, when a morning alarm function is set in the terminal main body, the controller 180 may check the user's sleep state based on the biological signal received from the device (S1002).

For this purpose, the controller 180 may first determine whether or not the main body is in an alarm mode. The alarm mode may be a mode in which an alarm function (or an alarm) is set for a specific time (for example, 6:30 am) or for a specific time zone (for example, 6:30 am to 7:30 am), which may additionally include or may not include a snoozing function, as aforementioned.

Also, when a current time is close to a preset morning alarm time (for example, 30 minutes before the preset morning alarm time), the controller 180 may transmit a control signal to the device so as to request for measuring or transmitting the user's biological signal from that moment.

In detail, the step of checking the user's sleep state based on the received biological signal may include determining whether the user is in a non-REM (NREM) state, in a REM sleep state, which is a state to easily wake up, or in an already waked state (namely, an awake state), based on the user's biological signal (for example, a pulse signal, an electrocardiogram signal, etc.).

Here, the received biological signal may include an operation signal of the user who is in the awake state. That is, when the user has already waken up, the user tosses and turns. This may cause an occurrence of noise in a frequency element of the biological signal. Accordingly, the controller 180 may check whether or not the user is in the awake state, in a manner of sensing the noise in the frequency element of the biological signal or monitoring whether or not power of the biological signal has increased suddenly.

An algorithm for determining the state may be previously stored in the memory 160. Also, the determination as to whether the user is in the awake state or in the sleep state may be carried out by another remote device which is connected through a wired/wireless communication network.

As such, when the user's state is determined as the sleep state based on the received biological signal, the controller 180 may control an alarm signal corresponding to the preset morning alarm time to be output by taking into account a sleep state in which the user can feel easy to wake up (S1003).

Here, the sleep state in which the user can easily wake up is a sleep stage for which the user is in the REM sleep state, and refers to a sleep state in which the user can wake up more comfortably with feeling less tired when the user wakes up.

In relation to this, sleep states of human beings may be divided into an NREM sleep and an REM sleep. In detail, the NREM sleep may consist of first to fourth stages. When a person starts to sleep, the sleep state enters a second stage via the first stage of the NREM sleep. Within about 30 to 45 minutes after starting to sleep, the sleep state may reach a deep sleep state, namely, a delta sleep (third and fourth stages of the NREM sleep). This state may last for about an hour, and thereafter, the sleep state may return to the second stage. After about 70 to 90 minutes, the sleep state reaches the first REM sleep. The NREM sleep and the REM sleep may be periodically repeated, and the REM sleep state may be maintained at a time interval of about 90 minutes. The sleep period may be accurately measured using brain waves. A physiological activity becomes stable when the sleep state is started, and is gradually decreased during the NREM sleep. The physiological activity then starts to increase during the REM sleep and reaches an almost awake level. Therefore, when a human being reaches the REM sleep state, he/she is in the best state to be awake due to a remarkable increase in blood pressure, heartbeats, a cardiac output, a respiration rate, body temperature, oxygen demand, and the like. On the other hand, in the third and fourth stages of the NREM sleep, most of physiological activities become less active and it is difficult to wake up. When a human being wakes up in these sleep stages, he/she stumbles and is thrown into confusion. The optimal wakeup time for maintaining physical rhythm as good as possible is the first and second stages of the NREM sleep, which correspond to stages before entering a deep sleep state after the end of the REM sleep.

Therefore, in accordance with the exemplary embodiment disclosed herein, in order to output an alarm in a state where the user can easily wake up, other than outputting the alarm immediately when a current time reaches a preset alarm time, an alarm signal may be generated at an optimal moment, earlier than the preset alarm time, in such a manner of monitoring a period, at which the user's biological signal is changed. Consequently, a time when the alarm signal is generated may not be matched by the preset alarm time.

As another example, when the preset alarm time is not in a state that the user can easily wake up (e.g., the NREM sleep state), the controller 180 may change the way of outputting a pre-registered alarm signal or change the pre-registered alarm signal into another alarm signal such that the user can feel less tired. For example, when an alarm sound has been set to 'siren,' if the preset alarm time is determined as a sleep state in which the user feel difficult to wake up, then the controller 180 may change the alarm sound into a more emotional sound, such as 'waves' or 'nature sounds.'

On the other hand, when the alarm time has been set to a 'time zone,' the controller 180 may decide a time corresponding to the state that the user can wake up the most easily within the set time zone, and output an alarm signal at the decided time.

Also, when the preset alarm time is not determined as the state that the user can easily wake up (for example, the NREM sleep state), the controller 180 may output an alarm by adjusting a level of the alarm, the number of alarming, strength of an alarm sound, the number of output devices, and the like. For example, when the preset alarm time is not determined as the state that the user can easily wake up (for example, the NREM sleep state), the controller 180 may output an alarm sound weaker than a pre-registered level, and then gradually increase the strength of the alarm sound.

The controller 180 may also control the alarm signal corresponding to the state that the user can easily wake up to be output from the device. In this case, the wireless communication unit 110 may transmit a control signal to the device such that the device can output an alarm sound (for example, sound or vibration) transferred from the controller 180.

When an event is received in the main body of the mobile terminal while the user is in a sleep state, the controller 180 may control a reception alarm function of the received event to be deactivated. For example, when the user is determined to be in a sleep state based on a biological signal, upon reception of an instant message, the controller 180 may control the display unit 170 to output only the received message and turn off the reception alarm function.

On the other hand, when it is determined in the step S302 that the user is waking up, the controller 180 may control the alarm function corresponding to the morning alarm time for today to be deactivated (S1004).

In detail, the controller 180 may enter a 'setting mode' of the alarm function so as to control only an alarm for today to be deactivated.

In this manner, as the alarm function is changed into an 'off' state when the user has waken up before the preset alarm time, the user may not suffer from releasing the alarm by manipulating the terminal, especially, from interfering with others' sleep due to ringing of an alarm sound at a preset time. Also, since the determination as to whether the user has waken up earlier than the preset alarm time should be repeated every day, the controller 180 may control only the morning alarm function for 'today' to be deactivated.

When a plurality of alarm times are set in the alarm function, the controller 180 may decide the number of alarms, which are to be deactivated, according to an interval between the preset alarm times. For example, when an initial morning alarm time and the next morning alarm time are set with an interval shorter than 30 minutes, all of the set morning alarm functions may be deactivated. Also, when the plurality of morning alarm times are set with a 2-hour interval, a second morning alarm function may remain activated with deactivating a first morning alarm function.

When a plurality of alarm times are set in the alarm function, the controller 180 may decide the number of alarms to be deactivated according to whether or not the plurality of alarm times set are within the same time zone.

Also, the controller 180 may control only an alarm function of a preset alarm time to be deactivated. To this end, the user may put a 'tick (✓)' in advance on activation or deactivation of the corresponding function upon setting the alarm.

Meanwhile, when the alarm function includes a snoozing function, the controller 180 may also deactivate the snoozing function upon deactivating the alarm function.

The controller 180 may also re-determine whether the user still remains awake every time interval corresponding to the snoozing function. For example, when the snoozing function is set to be alarmed every 5 minutes, the controller 180 may control an alarm signal not to be output at the preset alarm time, and determine whether or not the user enters the sleep state again at the time interval corresponding to the snoozing function, namely, every 5 minutes, based on the user's biological signal.

The controller 180 may also use a sensor value of another external device, instead of the biological signal, as a reference value for determining the user's awake state.

With regard to this, hereinafter, description will be given of exemplary embodiments of deactivating an alarm function when the user has waken up earlier than a preset alarm time due to a sensed another signal other than the user's biological signal, with reference to FIGS. 12 and 13.

Figure 12:
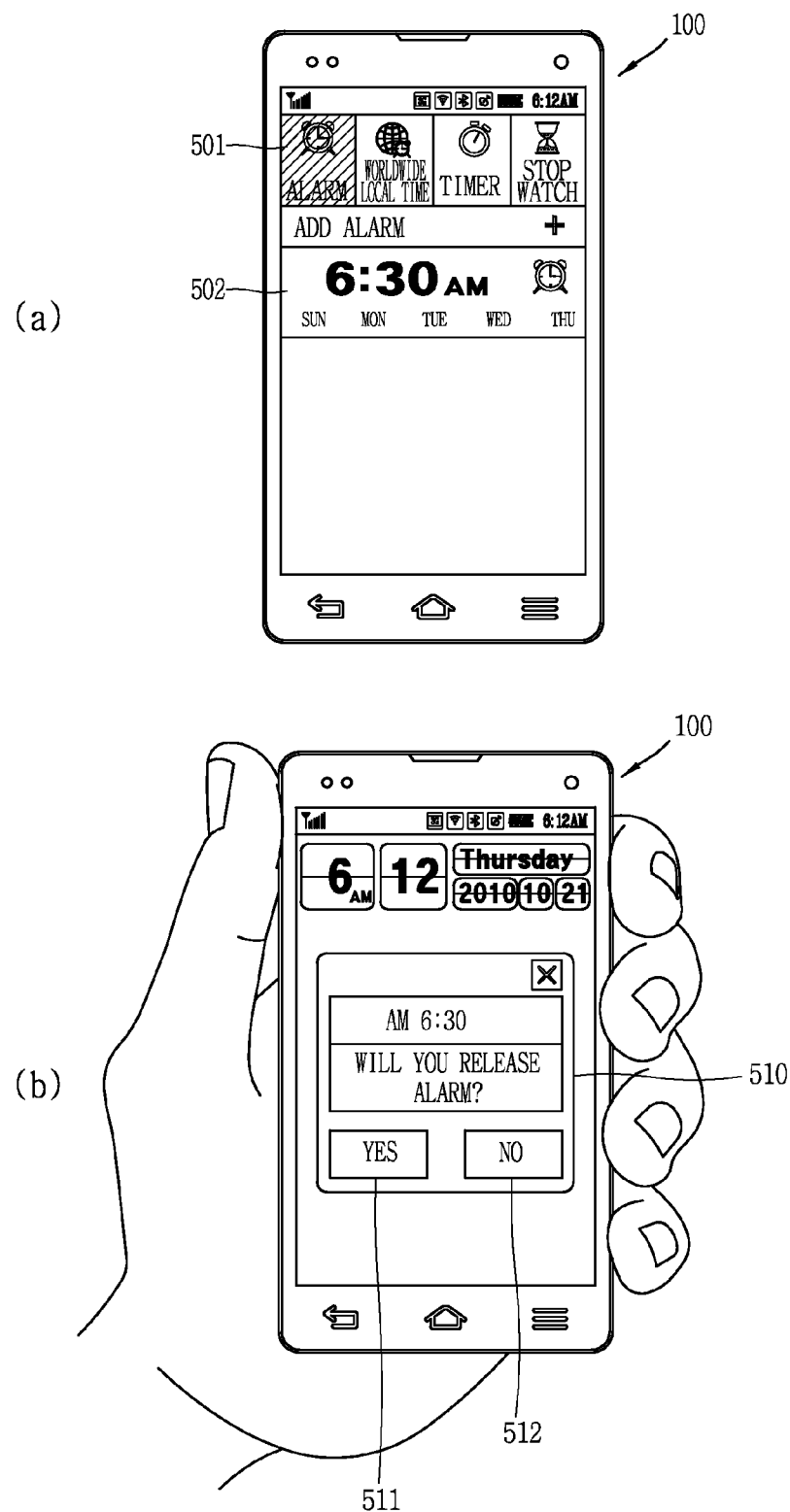
FIG. 12 is a view of a graphic user interface (GUI) for deactivating an alarm function of the terminal when a user manipulation is applied to the terminal, in accordance with one exemplary embodiment.

First, FIG. 12 is a view of a graphic user interface (GUI) for deactivating an alarm function of the terminal when a user manipulation is applied to the terminal, in accordance with one exemplary embodiment.

The controller 180 may sense a user manipulation applied to the main body prior to the preset morning alarm time. When the user manipulation is sensed, the controller 180 may output a GUI for releasing an alarm function corresponding to a morning alarm time for today on a screen of the display unit 170.

That is, when the manipulation with respect to the mobile terminal 100 is sensed, the controller 180 may determine that the user is in the awake state. The determination may be considered together with the user's biological signal or may be considered as a separate determination.

The controller 180 may also output the GUI even when the screen of the display unit 180 is a lock screen corresponding to a lock state of restricting an input of a control command with respect to an application.

For example, referring to (a) of FIG. 12, when the user has preset a morning alarm 502 for 6:30 am of 'Sunday, Monday, Tuesday, Wednesday, and Thursday' every week in a manner of manipulating an icon 501 for entering an alarm setting mode, if the user's manipulation with respect to the mobile terminal 100 is sensed prior to the preset morning alarm time, as illustrated in (b) of FIG. 12, a popup window 510 for requesting the release of the alarm may be immediately output even on the lock screen.

(b) of FIG. 12 exemplarily illustrates a GUI screen for releasing the alarm through the key manipulation, but if necessary, the alarm may also be released by inputting a user's voice command (for example, 'stop alarm!'). In another example, the alarm may be released by inputting a haptic signal, such as shaking or inclining the main body in a preset manner while the GUI screen is output.

Figure 13:
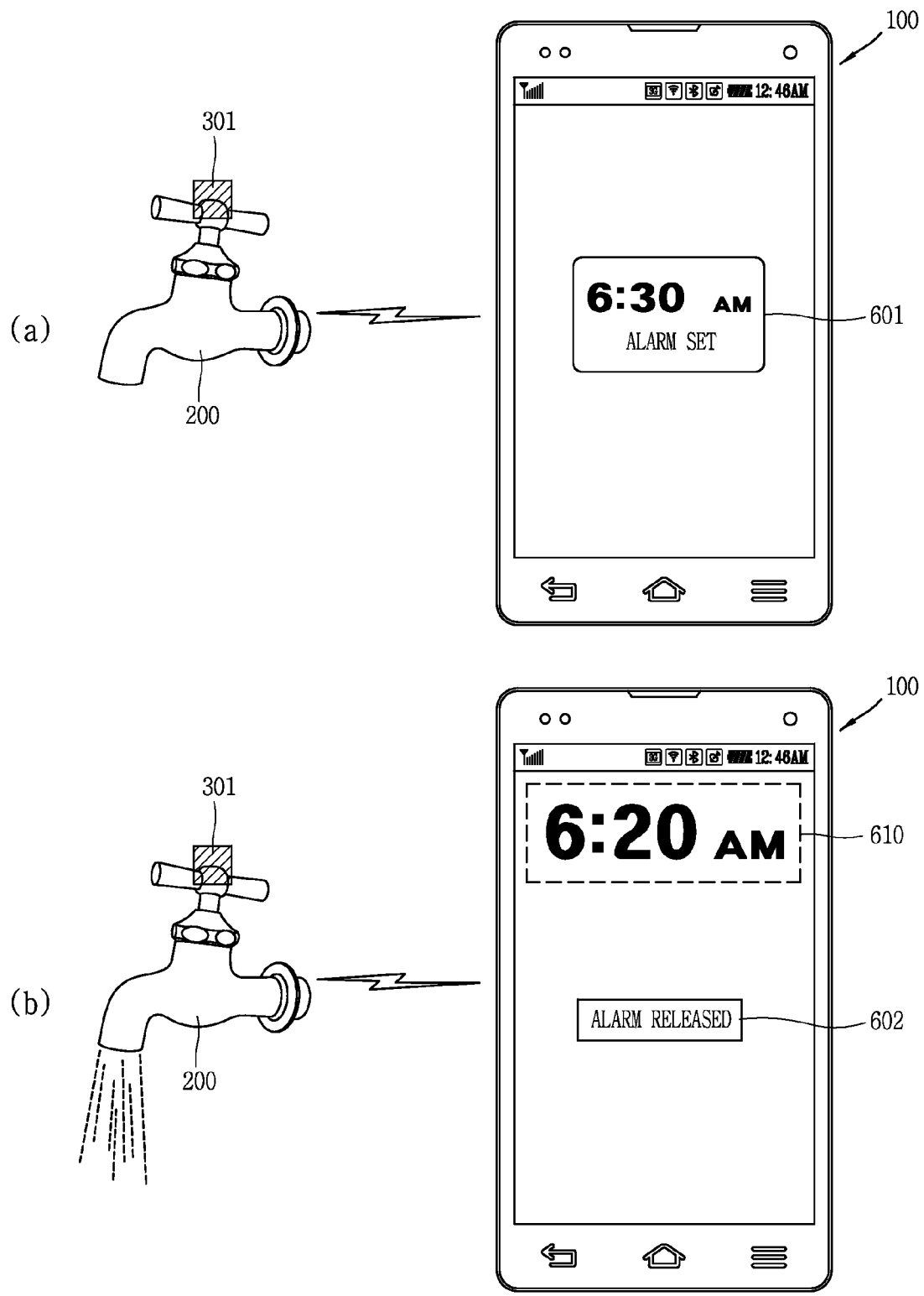
FIG. 13 is a view illustrating a deactivation of the alarm function of the terminal when an operation of an external device is sensed, in accordance with one exemplary embodiment.

FIG. 13 is an exemplary view illustrating a deactivation of the alarm function of the terminal when an operation of an external device is sensed, in accordance with one exemplary embodiment.

In detail, in accordance with the exemplary embodiment disclosed herein, the wireless communication unit 110 of the mobile terminal 100 may further receive an operation signal of at least one home appliance which has been sensed by a sensor mounted to the home appliance, in addition to the device. For example, as aforementioned with reference FIG. 11A, the plurality of signal measuring modules 301 may be mounted to each of home appliances or home facilities which are located within a home network, to sense operations of the corresponding home appliances or facilities.

Accordingly, the controller 180 may determine whether or not the user is in the awake state based on the operation signal received from the home appliance or home facility, together with the user's biological signal.

For example, referring to (a) of FIG. 13, in a state where an alarm time has been set for 6:30 am in the mobile terminal 100 and a home facility (for example, a tap) 200 is equipped with an operation signal measuring module 301 or a sensor having the corresponding function, when an operation signal is received from the operation signal measuring module 301 mounted to the home facility (for example, the tap) 200 before the alarm time comes, as illustrated in (b) of FIG. 13, the alarm may be released even though the current time 610 is earlier than the alarm time, and an icon 602 indicating the alarm release may be output on the display unit 170.

Although not illustrated, when the user's sleep state has been checked based on the biological signal received from the device mounted to the part of the user's body, then the controller 180 may control the home appliances or home facilities which are cooperative through wireless communication. This may allow for providing a residential environment which is appropriate for the user's sleep state.

For example, when the user's state determined based on the received biological signal is a sleep state, the controller 180 may control a morning alarm sound to be output in a sleep state, in which the user feels comfortable to wake up, within a preset alarm time zone, and simultaneously execute an operation of turning off a light or switching a wired phone into an automatic answering mode.

In this case, the controller 180 may output control information (for example, a device under control and control state information) related to the cooperated home appliance or home facility on the display unit 170.

The controller 180 may output, on the display unit 170, the user's sleep state which has been confirmed based on the biological signal and the like received at the step S302 (hereinafter, it should be understood that the terms 'biological signal and the like' indicate both a case of considering only the user's biological signal and a case of considering the operation signal of the home appliance or home facility as well as the user's biological signal).

With regard to this, hereinafter, description will be given of examples of outputting, on a screen, wearing or non-wearing of a device, for example, a link, and an icon corresponding to a user's sleep state on the basis of a sensed user's biological signal, with reference to FIGS. 14A to 14C.

Here, the link, which is formed to be worn around the user's wrist to measure the user's pulse signal, is merely illustrative, and the present disclosure may not be limited to this. The link may be wearable on any position of the user's body, such as the belly, the forearm, the head, the leg, the arm, and the like, if it is a point where the user's biological signal can be sensed.

When the user's biological signal is received from the worn link, the controller 180 may output an indicator, which indicates the user's sleep state corresponding to the received biological signal, on one region of the display unit 170. The indicator may not be limited in shape or type. As another example, a voice message may be output to notify the user's sleep state.

Figure 14A:
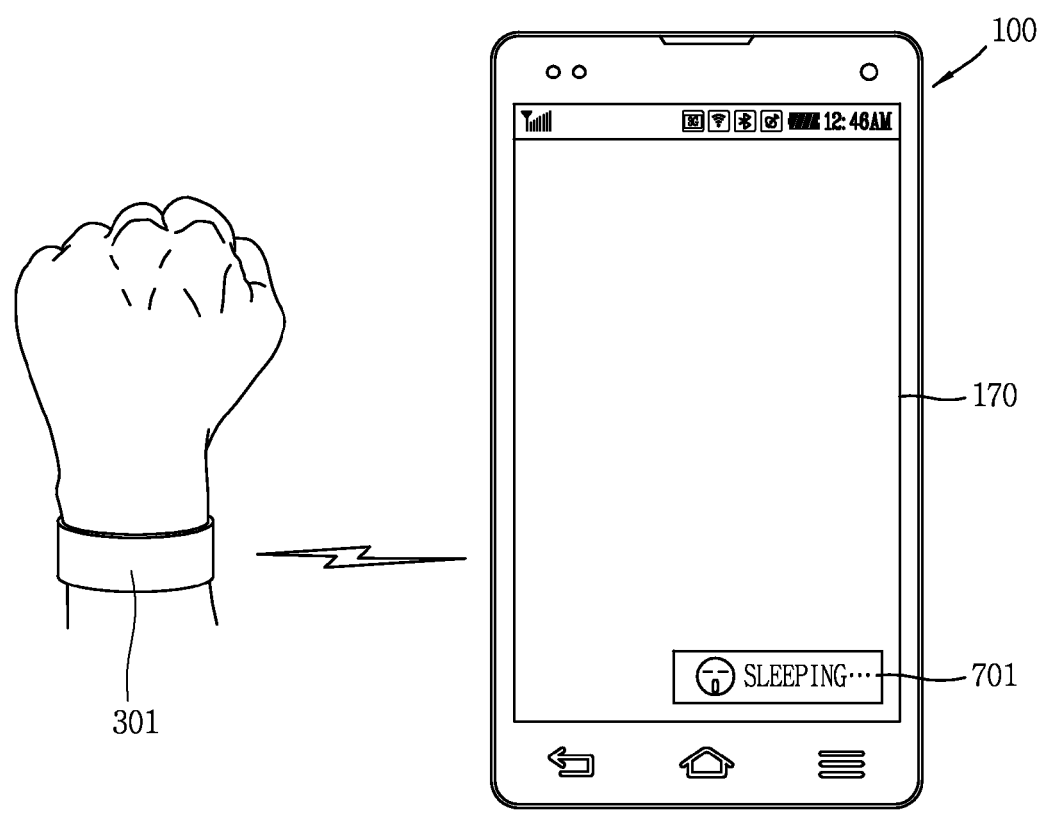
FIGS. 14A to 14C are views illustrating an output of wearing or non-wearing of a link and an icon corresponding to a user's sleep state by sensing the user's biological signal, in accordance with one exemplary embodiment.

For example, referring to FIG. 14A, when the user's state determined based on the biological signal received from the link 301 is a sleep state, an indicator 701, which includes an image and a text indicating the sleep state, may be output on one region of the display unit 170. Here, the preset alarm function, as aforementioned, may remain in an 'On' state but the other functions of the mobile terminal 100 may be changed or restricted. For example, a push alarm function associated with a message reception may be restricted while the user is sleeping. Also, an automatic answering mode may be activated when a call signal is received while the user is sleeping.

Meanwhile, when the user's sleep state is changed, the controller 180 may control the display unit 170 to output the indicator in a manner of changing the shape of the indicator.

Figure 14B:
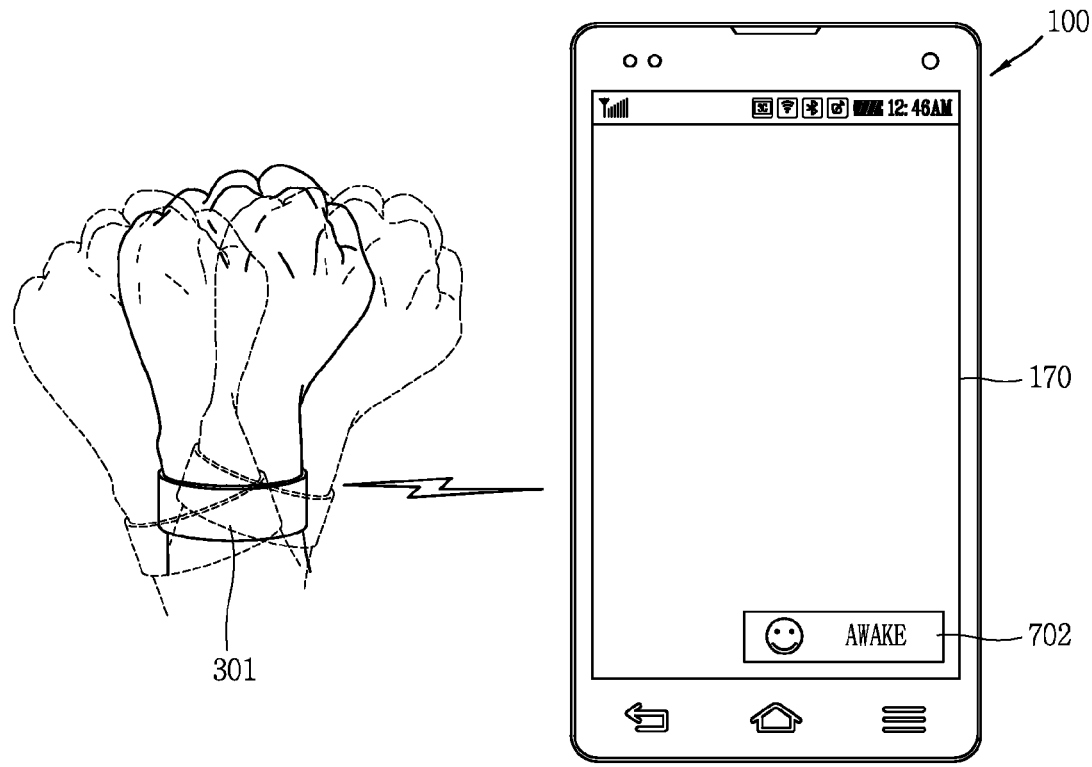
Figure 14C:
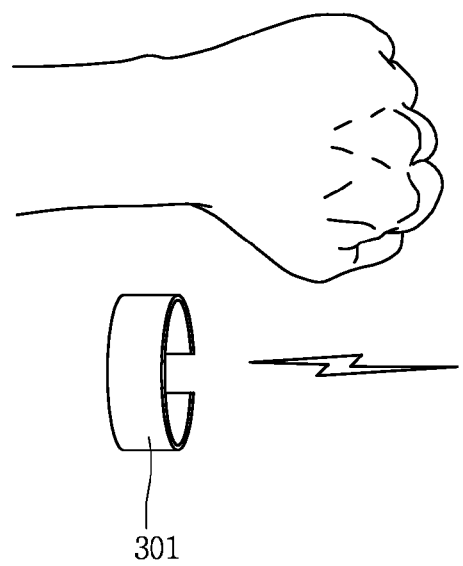
Figure 14C:
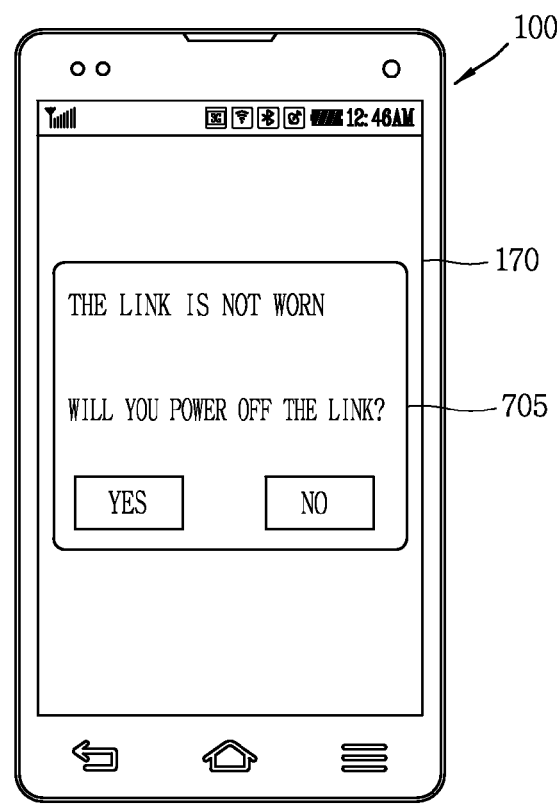

For example, referring to FIG. 14B, when the user's state determined based on the biological signal (or a motion signal may also be considered together) received from the link 301 is an awake state, an indicator 702, which includes an image and a text indicating the awake state, may be output on one region of the display unit 170. Here, the controller 180, as aforementioned, may deactivate the preset alarm function only for today. Also, the controller 180 may output a predetermined alarm sound as soon as the user's awake state being sensed.

On the other hand, when the link which transmits the biological signal for determining the user's sleep state does not operate or has been removed from the user's body, the link 301 may be powered off or switched into a sleep mode to prevent power consumption of the link 301.

To this end, when the pulse signal is not transmitted from the link 301 for a preset time (for example, over 1 minute), the controller 180 may output a notification message on the display unit 170 so as to request for switching the link into the sleep mode or a power-off state, thereby preventing the power consumption of the link 301.

Hereinafter, description will be given of an operating method of the mobile terminal when a preset event is generated after a morning alarm is set in the main body and the user's sleep state is confirmed based on the user's biological signal and the like.

Figure 15:
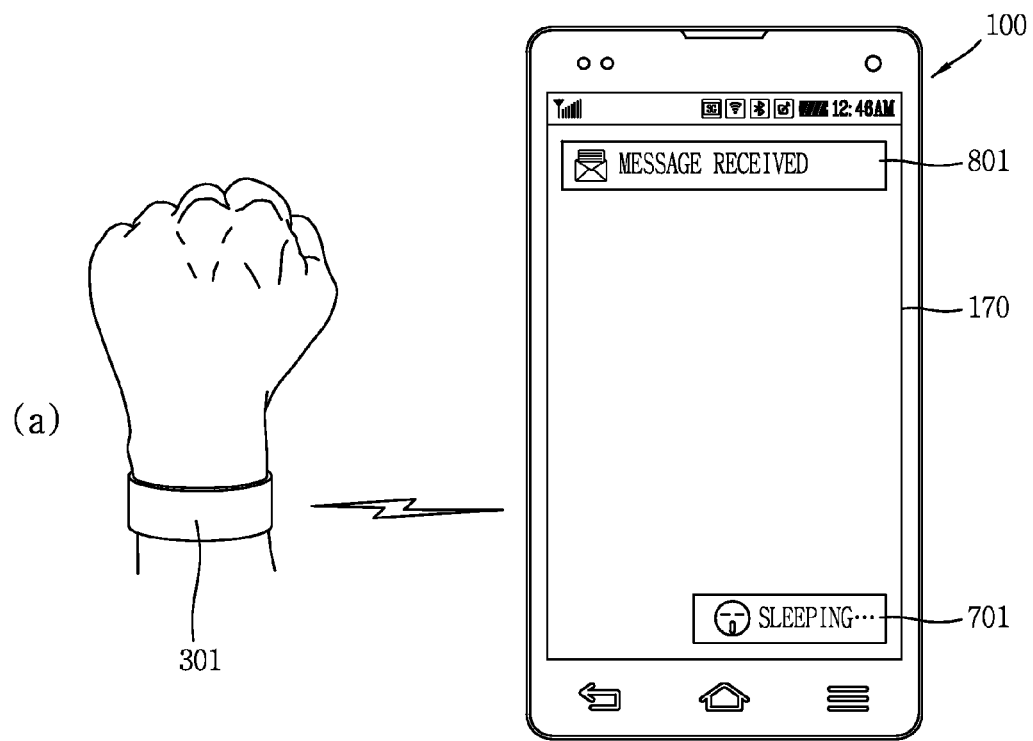
FIG. 15 is a view illustrating an activation or non-activation of a push alarm function according to a received event when a user is in a sleep state, in accordance with one exemplary embodiment.
Figure 15:
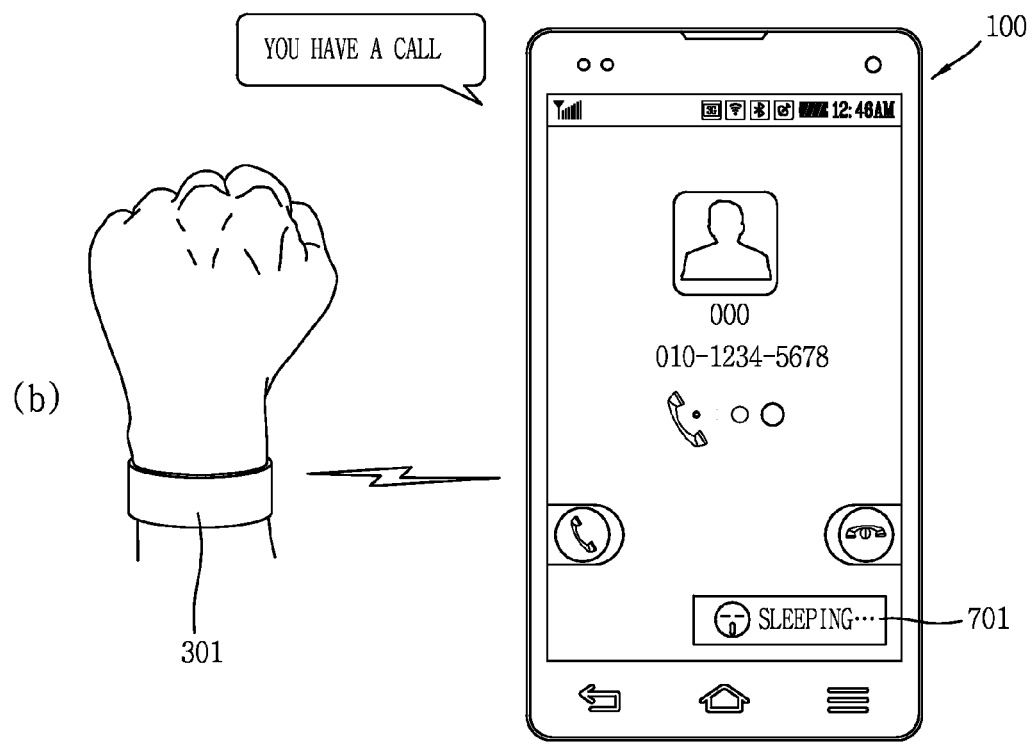

In relation to this, FIG. 15 is an exemplary view illustrating an activation or non-activation of a push alarm function according to a received event when a user is in a sleep state, in accordance with one exemplary embodiment.

Here, the term 'event' refers to affecting an operation of at least one application installed in the terminal, changing an item of a database (or a data file) associated with the at least one application, or generating data transmission and reception with an external terminal or an external network through the at least one application. For example, the event may include a generation of a push alarm, in response to 'call reception,' 'message reception,' function switching, screen switching, or the like.

In detail, when an event is received after it is determined the user's state corresponding to the received biological signal is a sleep state, the controller 180 may control a reception alarm function of the received event to be deactivated. Accordingly, a user environment which is suitable for the sleep state may be provided such that the user can sleep without interference.

Also, the controller 180 may control activation or deactivation of the reception alarm function to be differently set according to a type of a generated or received event or a user setting.

For example, when an event (for example, a call) with high importance is received, the reception alarm function may be activated to notify the event reception. Or, when the user is determined to be in the sleep state, strength of the alarm (for example, a volume of sound, the number of alarm means, an interval of the alarm, etc.) may be increased. On the other hand, when an event with low importance is received or an event of an application which has been set as one with low importance through a user input is received, the reception alarm function may be automatically changed into an 'off' state so as to prevent an interference with the user's sleep.

When the user's state determined based on the biological signal received from the link 301 in (a) of FIG. 15 is a sleep state (701), upon a reception of an instant message 801, it may be determined as an unimportant event and accordingly a reception alarm may not be output. However, a reception or non-reception of the message and the message may be displayed on the display unit 170.

Meanwhile, in the user's sleep state (701) in (b) of FIG. 15, upon a reception of a call, it may be decided as a generation of an important event, and a reception alarm may be output in the form of 'sound' (for example, a voice message saying 'You have a call'). It may also be possible to deactivate beforehand a reception alarm for every event generation through a user input, when the user is in the sleep state.

Hereinafter, description will be given of various exemplary embodiments of related functions based on a measured user's biological signal when a device according to an exemplary embodiment is a link in the shape of being worn around a user's wrist, with reference to FIG. 16.

As illustrated in FIG. 16, first, the mobile terminal 100 according to the exemplary embodiment may sense wearing of a link which is worn around the user's wrist. The link may sense the user's pulse signal to transmit to the mobile terminal 100.

In detail, when the pulse signal is not transmitted from the link for a preset time, the controller 180 may determine that the link has not been worn. Accordingly, the controller 180 may output a notification message on the display unit 170 to request for switching the link into a sleep mode or a power-off state, thereby preventing unnecessary power consumption.

The mobile terminal 100 may receive the user's pulse signal from the link (S901). Here, the pulse signal may be received via short-range wireless communication, as aforementioned.

Next, when a morning alarm section is set in the mobile terminal, the controller 180 may monitor whether or not a current time enters the set morning alarm section (S902). Here, the setting of the alarm section may be carried out through a user input, or as will be explained herebelow, may be automatically set based on a history of alarm time at which the user feels easy to wake up.

Upon the entrance into the morning alarm section, the controller 180 may control an alarm signal to be output at an alarm time, at which the user feels easy to wake up, within the set morning alarm section based on the pulse signal received from the link (S903).

Here, the alarm time at which the user feels easy to wake up, as aforementioned, refers to a case where the user's sleep state determined from the pulse signal is the REM state, namely, a sleep state in which the user can wake up more comfortably. Also, the output method of the alarm signal may be one of light, sound, vibration and a combination thereof.

Meanwhile, when a removal of the link is sensed, that is, when the biological signal was received but it has not been received for more than a preset time, the controller 180 may set an alarm signal, which corresponds to the preset morning alarm time or an alarm time at which the user feels easy to wake up, to be output at least in the form of 'sound.' That is, the controller 180 may determine that it is senseless the 'link' to output the alarm signal in the form of vibration, so as to control the link to output the alarm signal in the form of 'sound' which is a type of alarm that the user feels easy to wake up.

A history of alarm time, at which the user feels easy to wake up, within the preset morning alarm section, may be stored in the memory 160 for a preset period of time (for example, 30 days or 3 months) (S904).

When the history of alarm time is stored, the controller 180 may sense a preset input signal applied, and recommend an optimal alarm time zone based on the stored history of alarm time (S905).

Here, the preset input signal may be a preset type of user input, for example, a user's touch with respect to a specific key or a user's input of a preset voice signal or an operation signal. In response to such user input, the controller 180 may recognize it as a control command for recommending the optimal alarm time zone.

There may be no limit to the recommendation method for setting the optimal alarm time zone, and the controller 180 may output a related user interface on the display unit 170 or through the audio output module 153. For example, when the control command for recommending the optimal alarm time zone is input, the controller 180 may pop up a text message, such as Will you set the alarm for the recommended alarm time zone?' on the display unit 170, together with the recommended optimal alarm time zone.

Meanwhile, when the alarm signal, which is output on a specific day according to the execution result of the steps S901 to S903, exceeds the history of alarm time, stored in the memory 160, more than a reference value or exceeds the recommended optimal alarm time zone, the controller 180 may determine that the user is in an abnormal sleep state and accordingly output a notification signal corresponding to the determination (S906).

When the user is determined to be in the abnormal sleep state, the record may be stored in the memory 160.

When a current location of the main body approaches a place (for example, a hospital, a drug store, a mart, etc.), at which the user can get services of counseling, diagnosing, monitoring or treating the abnormal sleep state, the controller 180 may output a predetermined alarm signal such that the user can recognize it (S907).

To this end, the wireless communication unit 110 of the mobile terminal 100 may receive location information related to the main body.

The wireless communication unit 110 may acquire the location information on the main body in various manners. For example, the wireless communication unit 110 may receive the main body-related location information using a global positioning system (GPS) or a Wi-Fi positioning system (WPS) among positioning technologies. Also, the wireless communication unit 110 may receive current time information from a base station.

Here, the GPS refers to a system of receiving the main body-related location information from a satellite which orbits the earth. That is, the wireless communication unit 110 may acquire the main body-related location information based on latitude information and longitude information received from the GPS. On the other hand, the WPS refers to a system of deciding the location of the main body using database (DB) information related to a virtual access point (AP) constructed through War-driving and wireless local area network (WLAN) AP information received from the mobile terminal 100. That is, the wireless communication unit 110 may acquire the main body-related location information through triangulation based on the AP position of Wi-Fi.

For example, when the current location of the main body is near a hospital or a drug store (it may be limitedly set to a specific point), the controller 180 may output a text message or a voice message indicating 'There is a '○○ hospital nearby. You have an abnormal sleep these days. So, we recommend you to get counseling.'

It can be useful in that the user can get a health care for his/her heath condition using sleep data determined based on the biological signal.

Meanwhile, the user may also be allowed to utilize the sleep data in more various manners through the link which wirelessly communicates with the mobile terminal.

According to a first exemplary embodiment, when a specific destination has been set in the main body of the mobile terminal through a user input, the controller 180 may provide a route to reach the set destination based on the location information related to the main body, or output distance information from the current location to the destination.

In this state, when the location of the main body is out of the set route or the main body arrives at the set destination, the controller 180 may control the link to output a vibration alarm. For example, when the mobile terminal is in the user's bag, the user may be aware of the deviation from the route or the arrival at the destination even without taking the mobile terminal 100 out of the bag. In addition, the controller 180 may control road guidance voice information to be output when a speaker or the like is further provided in the link.

According to a second exemplary embodiment, the controller 180 may calculate a user' stress level based on the biological signal received from the link. Values corresponding to stress levels may be pre-stored in the memory 160 to be compared and determined by the controller 180.

When the calculated stress level exceeds a preset threshold value, the controller 180 may control the alarm function corresponding to an event generation (for example, a message reception, a call reception, etc.) to be deactivated, and a popup of a notification message with low importance (for example, a message indicating a network state) to be restricted.

When the calculated stress level exceeds the preset threshold value, the controller 180 may control a current screen output on the display unit 170 to be changed into a preregistered content screen so as to reduce the user's stress. In addition to this, the controller 180 may further output a corresponding sound effect (for example, 'natural sound').

As described above, in a mobile terminal and a control method thereof according to exemplary embodiments, a worn position of a main body of the mobile terminal may be sensed by itself and a more convenient user interface can be provided to a user according to the sensed worn position. Accordingly, a method of applying a user input and a method of displaying an execution result corresponding to the input may be changed conveniently according to the worn position, thereby providing more intuitive and optimized user environments. Also, a morning alarm function for today may be deactivated when the user is determined to be waken up earlier than a preset alarm time, in such a manner that a user's biological signal is sensed by the terminal worn on a specific portion of the user's body. According to the deactivation, when the user has waken up, the user or a third party cannot be interfered due to the alarm going off at the preset alarm time and the user may not need to separately release the alarm function. This may arouse user convenience. The terminal may also determine whether or not the user is in an awake state by sensing whether or not a home appliance is operating or used. Accordingly, the morning alarm function for today may be deactivated when the user has waked up, and a push alarm set in the terminal may be restricted when the user is sleeping, thereby automatically providing a smart alarm function suitable for the user's state. In addition, a history of alarm time at which the user feels easy to wake up may be stored by monitoring the user's pulse signal for a predetermined period of time, a normal or abnormal sleep state of the user may be determined based on the stored history, and an alarm signal may be output when the main body approaches a related place. This may have an advantage in view of checking the user's health condition based on sleep data.

Further, in accordance with one embodiment of the present disclosure, the aforementioned methods can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the mobile terminal.

The configurations and methods of the mobile terminal and the control method thereof in the aforesaid embodiments may not be limitedly applied, but such embodiments may be configured by a selective combination of all or part of the embodiments so as to implement many variations.

What is claimed is:

1. A wearable mobile terminal comprising:
    a main body configured and sized to be worn on a part of a user's body;
    a display comprising a touchscreen and configured to display information and to receive a touch input;
    a sensor configured to sense wearing of the main body on the part of the user's body; and
    a controller configured to:
        recognize a user input for recognizing a worn position of the main body when the main body is worn on the part of the user's body, the user input sensed by the sensor;
        cause output of information for notifying the recognized worn position in response to the user input, the recognized worn position being a first worn position or a second worn position;
        cause the display to display icons for generating a control command on a first area of the touchscreen, the first area corresponding to the first worn position; and
        cause the display to display the icons on a second area of the touchscreen, the second area corresponding to the second worn position, when the recognized worn position of the main body is changed from the first worn position to the second worn position.

2. The terminal of claim 1, further comprising an output unit configured to output a message, wherein:
    the sensor comprises a gyro sensor; and
    the controller is further configured to:
        cause the output unit to output a request message for requesting the user input when the main body is worn on the user's body; and
        determine that the main body is worn on a specific part of the user's body by analyzing a sensor value generated by the gesture when the user input is received.

3. The terminal of claim 1, wherein the controller is further configured to determine the worn position based on a specific pattern of the user input generated during a preset period of time when the main body is worn on the user's body.

4. The terminal of claim 1, wherein the controller is further configured to determine that the main body is worn on the part of the user's body based on whether a connector coupled to the main body is in contact with the user's body and a biological signal of the user's body sensed by the sensor.

5. The terminal of claim 1, wherein the controller is further configured to:
   cause the display to display a menu for allowing selection of a first mode or a second mode, each of the first and second modes determining the worn position differently;
   cause the display to display a list in the first mode, the list including parts of the body with which the main body can be in contact and to receive the user input for selecting one of the parts included in the displayed list; and
   determine the worn position in the second mode based on the user input corresponding to a gesture generated by the user without displaying the list.

6. The terminal of claim 1, wherein the controller is further configured to:
   cause the display to display information on a first region of the touchscreen and to display keys for controlling the information on a second region of the touchscreen; and
   arrange the first region and the second region of the touchscreen based on the recognized worn position such that the first region and the second region are arranged differently on the touchscreen when the worn position of the main body is changed from the first won position to the second worn position.

7. The terminal of claim 6, wherein the second region is arranged at a right side of the touchscreen and the first region is arranged at a left side of the second region when the main body is located at a left wrist of the user.

8. The terminal of claim 6, wherein the second region is arranged at a left side of the touchscreen and the first region is arranged at a right side of the second region when the main body is located at a right wrist of the user.

9. The terminal of claim 1, wherein the controller is further configured to cause the display to:
   change a lock screen according to the recognized worn position of the main body; and
   display an idle screen according to the recognized worn position of the main body in response to an input for releasing the terminal from the locked state.

10. The terminal of claim 1, wherein the controller is further configured to:
    activate a first function corresponding to a first input when the recognized worn position of the main body is a first part of the user's body; and
    deactivate the first function corresponding to the first input when the recognized worn position is changed from the first part to a second part of the user's body.

11. The terminal of claim 1, further comprising an output unit configured to output the information as at least visual or audible information, wherein the controller is further configured to cause the output unit to:
    output event information related to occurrence of an event based on the recognized worn position; and
    output an alarm for notifying occurrence of the event in a different manner based on the recognized worn position.

12. The terminal of claim 1, wherein the controller is further configured to cause the display to display a user interface that is different from a user interface including the icons when the main body is removed from the part of the user's body.

* * * * *